(12) United States Patent
Ashraf et al.

(10) Patent No.: US 10,306,641 B2
(45) Date of Patent: *May 28, 2019

(54) RESOURCE ALLOCATION IN A WIRELESS NETWORK

(71) Applicant: Telefonaktiebolaget LM Ericsson (publ), Stockholm (SE)

(72) Inventors: Shehzad Ali Ashraf, Aachen (DE); Nadia Brahmi, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/868,019

(22) Filed: Jan. 11, 2018

(65) Prior Publication Data

US 2018/0139757 A1 May 17, 2018

Related U.S. Application Data

(63) Continuation of application No. 15/003,852, filed on Jan. 22, 2016, now Pat. No. 9,907,074, which is a continuation of application No. PCT/EP2015/051337, filed on Jan. 23, 2015.

(51) Int. Cl.
*H04W 72/04* (2009.01)
*H04W 72/12* (2009.01)
*H04W 72/10* (2009.01)

(52) U.S. Cl.
CPC ... *H04W 72/0453* (2013.01); *H04W 72/0486* (2013.01); *H04W 72/10* (2013.01); *H04W 72/1226* (2013.01); *H04W 72/1252* (2013.01); *H04W 72/1242* (2013.01)

(58) Field of Classification Search
None
See application file for complete search history.

(56) References Cited

U.S. PATENT DOCUMENTS

| 8,681,612 B2 | 3/2014 | Wentink |
| 2003/0103520 A1* | 6/2003 | Chen ......................... H04L 47/14 370/444 |
| 2007/0076655 A1 | 4/2007 | Manjeshwar et al. |
| 2010/0014423 A1* | 1/2010 | Furuskar ............... H04W 74/02 370/235 |

(Continued)

FOREIGN PATENT DOCUMENTS

| EP | 3 035 754 A1 | 6/2016 |
| JP | 2001-045554 A | 2/2001 |

(Continued)

OTHER PUBLICATIONS

Mundhenk et al., "Policy-based Message Scheduling Using FlexRay", *ESWEEK '14—International Conference on Hardware/Software Codesign and System Systhesis*, New Delhi, India, Oct. 12-17, 2014, 10 pp.

(Continued)

*Primary Examiner* — Kodzovi Acolatse
(74) *Attorney, Agent, or Firm* — Sage Patent Group

(57) ABSTRACT

A control message prospectively indicates a need of a communication device sending a data packet of a first class of data employing radio resources. The radio resources are reserved at least for the first class of data.

20 Claims, 19 Drawing Sheets

(56) References Cited

U.S. PATENT DOCUMENTS

| | | | |
|---|---|---|---|
| 2010/0254344 A1* | 10/2010 | Wei | H04W 16/10 370/330 |
| 2010/0304772 A1* | 12/2010 | Wang | H04W 72/1278 455/509 |
| 2012/0008591 A1* | 1/2012 | Miki | H04J 13/16 370/330 |
| 2014/0256284 A1 | 9/2014 | Cordeiro et al. | |
| 2016/0270123 A1* | 9/2016 | Wang | H04W 74/0875 |

FOREIGN PATENT DOCUMENTS

| | | |
|---|---|---|
| JP | 2013-543327 A | 11/2013 |
| JP | 2014-525175 A | 9/2014 |
| WO | WO 2013/006650 A1 | 1/2013 |
| WO | WO 2014/188342 A1 | 11/2014 |
| WO | WO 2016/055103 A1 | 4/2016 |

OTHER PUBLICATIONS

International Search Report and Written Opinion of the International Searching Authority, Application No. PCT/EP2015/051337, dated Dec. 9, 2015.

Communication Pursuant to Article 94(3) for European Patent Application No. 15702683.2 dated Sep. 19, 2018, 5 Pages.

Letter and English translation of Summary of Office Action dated Sep. 7, 2018 for Japanese Patent Application No. 2017-536950, 4 Pages.

\* cited by examiner

RESOURCE ALLOCATION IN A WIRELESS NETWORK

CROSS REFERENCE TO RELATED APPLICATIONS

This application is a continuation of U.S. patent application Ser. No. 15/003,852, filed on Jan. 22, 2016, which itself is a continuation of PCT International Application No. PCT/EP2015/051337, filed on Jan. 23, 2015, the disclosure and content of each of which are incorporated herein by reference herein in their entireties.

TECHNICAL FIELD

Various embodiments relate to a communication device, to an access node of a wireless network, and to a system. In particular, various techniques relate to resource allocation in a wireless network. A need for sending of a data packet of a first class of data employing radio resources which are reserved at least for the first class of data is signalled.

BACKGROUND

Wireless network technologies exists which are employed in industrial applications. One example technology is WirelessHART, as specified by IEEE 802.15.4-2006 of the Institute of Electrical and Electronics Engineers. A further example, is ISA100.11a "Wireless Systems for Industrial Automation: Process Control and Related Applications" of the International Society of Automation (ISA).

Such existing technologies suffer from certain limitations. E.g., it may not be possible or only possible to a limited degree to provide, both, a high reliability of transmission as well as a low latency of transmission. In particular, in scenarios where it is required to accommodate multiple classes of data with different priorities for transmission, such existing techniques may face certain restrictions and drawbacks in terms of transmission reliability and transmission latency.

SUMMARY

Therefore, a need exists to provide techniques which alleviate at least some of the above-mentioned limitations and drawbacks. This need is met by the features of the independent claims. The dependent claims define embodiments.

According to various embodiments, a communication device is provided. The communication device comprises a wireless interface. The wireless interface is configured to transceive data on a channel of a wireless network. The communication device further comprises a memory. The memory is configured to store information indicating radio resources on the channel. The radio resources are reserved for a first class of data and for a second class of data. The radio resources are shared between the communication device and the further communication device. The communication device further comprises at least one processor. The at least one processor is configured to receive, via the wireless interface, a control message. The control message prospectively indicates a time-frequency resource block of the radio resources. The control message further prompts the communication device to mute transmission in the indicated time-frequency block of the radio resources on the channel. The at least one processor is configured to retrieve the stored information from the memory. The at least one processor is further configured to control the wireless interface to mute transmission in the indicated time-frequency resource block of the radio resources on the channel in response to said receiving of the control message.

According to various embodiments, a communication device is provided. The communication device comprises a wireless interface. The wireless interface is configured to transceive data on a channel of a wireless network. The communication device further comprises a memory. The memory is configured to store information. The information indicates first radio resources on a channel. The first radio resources are reserved for a first class of data. The information further indicates second radio resources on the channel. The second radio resources are reserved for a second class of data. The first radio resources are shared between the communication device and the further communication device. The communication device further comprises at least one processor. The at least one processor is configured to retrieve the stored information from the memory and to select between the first radio resources and the second radio resources for sending of a data packet of the second class of data. Said selecting depends on a traffic load on a channel in the second radio resources. The at least one processor is configured to send, via the wireless interface on the channel, the data packet of the second class of data employing the first radio resources if the first radio resources are selected.

According to various embodiments, a method is provided. The method comprises a memory storing information indicating radio resources on a channel of a wireless network. The radio resources are reserved for a first class of data and for a second class of data. The radio resources are shared between a communication device and a further communication device. The method further comprises at least one processor receiving, via a wireless interface, a control message. The control message prospectively indicates a time-frequency resource block of the radio resources. The control message further prompts the communication device to mute transmission in the indicated time-frequency resource block on the channel. The method further comprises the at least one processor retrieving the stored information from the memory. The method further comprises the at least one processor controlling the wireless interface to mute transmission in the indicated time-frequency resource block on the channel in response to said receiving of the control message.

According to various embodiments, a method is provided. The method comprises a memory storing information. The information indicates first radio resources on a channel of a wireless network. The first radio resources are reserved for a first class of data. The information further indicates second radio resources on the channel. The second radio resources are reserved for a second class of data. The first radio resources are shared between a communication device and a further communication device. The method further comprises at least one processor retrieving the stored information from the memory and selecting between the first radio resources and the second radio resources for sending of a data packet of the second class of data. Said selecting depends on a traffic load on the channel in the second radio resources. The method further comprises the at least one processor sending, via the wireless interface on the channel, the data packets of the second class of data employing the first radio resources if the first radio resources are selected.

According to various embodiments, a communication device is provided. The communication device comprises a wireless interface. The wireless interface is configured to transceive data on a channel of a wireless network. The communication device further comprises a memory. The memory is configured to store information indicating radio resources on a channel. The radio resources are reserved at least for a first class of data. The radio resources are shared between the communication device and the further communication device. The communication device further comprises at least one processor. The at least one processor is configured to send, via the wireless interface, a control message. The control message prospectively indicates a need of sending a data packet of the first class of data employing the radio resources. The at least one processor is further configured to send, via the wireless interface on the channel, the data packet of the first class of data employing the radio resources.

According to various embodiments, a method is provided. The method comprises a memory storing information indicating radio resources on a channel of a wireless network. The radio resources are reserved at least for a first class of data. The radio resources are shared between the communication device and the further communication device. The method further comprises at least one processor sending, via the wireless interface, a control message. The control message prospectively indicates a need of the communication device sending a data packet of a first class of data employing the radio resources. The method further comprises the at least one processor sending, via the wireless interface on the channel, the data packet of a first class of data employing the radio resources.

According to various embodiments, an access node of a wireless network is provided. The access node comprises a wireless interface. The wireless interface is configured to transceive data on a channel of the wireless network. The access node further comprises at least one processor configured to prospectively allocate, on the channel in a shared manner, radio resources. The radio resources are reserved at least for a first class of data to the communication device and to the further communication device. The at least one processor is further configured to receive, via the wireless interface from the communication device, a control message. The control message prospectively indicates a need of the communication device sending a data packet of the first class of data employing the radio resources. The at least one processor is configured to select a time-frequency resource block of the radio resources for said sending of the data packets of the first class of data by the communication device. The at least one processor is further configured to send, via the wireless interface to the communication device and to the further communication device, a further control message. The further control message indicates the selected time-frequency resource block of the radio resources. A further control message prompts the further communication device to mute transmission in the time-frequency resource of the radio resources on the channel. The further control message prompts the communication device to send the data packets of the first class of data employing the time-frequency resource block of the radio resources on the channel.

According to various embodiments, a method is provided. The method comprises at least one processor prospectively allocating, on a channel of the wireless network and in a shared manner, radio resources. The radio resources are reserved at least for a first class of data to a communication device and to a further communication device. The method further comprises the at least one processor receiving, via a wireless interface from the communication device, a control message. The control message prospectively indicates a need of the communication device sending a data packet of the first class of data employing the radio resources. The method further comprises the at least one processor selecting a time-frequency resource block of the radio resources for said sending of the data packet of the first class of data by the communication device. The method further comprises the at least one processor sending, via the wireless interface to the communication device and to the further communication device, a further control message. The further control message indicates the selected time-frequency resource block of the radio resources. The further control message prompts the further communication device to mute transmission in a time-frequency resource block on the radio resources on the channel. The further control message further prompts the communication device to send the data packet of the first class of data employing the time-frequency resource block of the radio resources on the channel.

According to various embodiments, a system is provided. The system comprises a first communication device and a second communication device. The first communication device comprises a wireless interface and a memory and at least one processor. The wireless interface of the first communication device is configured to transceive data on a channel of a wireless network. The memory of the first communication device is configured to store information indicating first radio resources on the channel and further indicating second radio resources on the channel. The first radio resources are reserved for a first class of data. The second radio resources are reserved for a second class of data. The first radio resources are shared between the first communication device and the second communication device. The second communication device comprises a wireless interface and a memory and at least one processor. The wireless interface of the second communication device is configured to transceive data on the channel of a wireless network. The memory of the second communication device is configured to store information indicating the first radio resources. The at least one processor of the second communication device is configured to send, via the wireless interface of the second communication device, a control message. The control message prospectively indicates a need of sending a data packet of the first class of data employing the first radio resources. The control message further prompts the first communication device to mute transmission in the indicated time-frequency resource block of the first radio resources on the channel. The at least one processor of the first communication device is configured to receive, via the wireless interface of the first communication device on a channel, the control message. The at least one processor of the first communication device is further configured to select between the first radio resources and the second radio resources for said sending of the data packet of the second class of data depending on a traffic load on the channel in the second radio resources and further depending on the indicated time-frequency resource block of the first radio resources. The at least one processor of the first communication device is further configured to control the wireless interface to mute transmission in the indicated time-frequency resource block of the first radio resources on the channel in response to said receiving of the control message. The at least one processor of the first communication device is configured to send, via the wireless interface on the channel, the data packet of the second class of data employing the first radio resources if the first radio resources are selected. The at least one processor of the second communication device is further configured to send, via the wireless interface on the channel, the data packet of a first class of data employing the first class of radio resources.

According to various embodiments, a computer program product is provided. The computer program product comprises program code to be executed by at least one processor of a network device of a wireless network, wherein execution of the program code causes the at least one processor execute a method comprising controlling a memory to store information indicating radio resources on a channel of a wireless network. The radio resources are reserved for a first class of data and for a second class of data. The radio resources are shared between a communication device and a further communication device. The method further comprises the at least one processor receiving, via a wireless interface, a control message. The control message prospectively indicates a time-frequency resource block of the radio resources. The control message further prompts the communication device to mute transmission in the indicated time-frequency resource block on the channel. The method further comprises the at least one processor retrieving the stored information from the memory. The method further comprises the at least one processor controlling the wireless interface to mute transmission in the indicated time-frequency resource block on the channel in response to said receiving of the control message.

According to various embodiments, a computer program product is provided. The computer program product comprises program code to be executed by at least one processor of a network device of a wireless network, wherein execution of the program code causes the at least one processor execute a method comprising controlling a memory to store information. The information indicates first radio resources on a channel of a wireless network. The first radio resources are reserved for a first class of data. The information further indicates second radio resources on the channel. The second radio resources are reserved for a second class of data. The first radio resources are shared between a communication device and a further communication device. The method further comprises the at least one processor retrieving the stored information from the memory and selecting between the first radio resources and the second radio resources for sending of a data packet of the second class of data. Said selecting depends on a traffic load on the channel in the second radio resources. The method further comprises the at least one processor sending, via the wireless interface on the channel, the data packets of the second class of data employing the first radio resources if the first radio resources are selected.

According to various embodiments, a computer program product is provided. The computer program product comprises program code to be executed by at least one processor of a network device of a wireless network, wherein execution of the program code causes the at least one processor execute a method comprising the at least one processor prospectively allocating, on a channel of the wireless network and in a shared manner, radio resources. The radio resources are reserved at least for a first class of data to a communication device and to a further communication device. The method further comprises the at least one processor receiving, via a wireless interface from the communication device, a control message. The control message prospectively indicates a need of the communication device sending a data packet of the first class of data employing the radio resources. The method further comprises the at least one processor selecting a time-frequency resource block of the radio resources for said sending of the data packet of the first class of data by the communication device. The method further comprises the at least one processor sending, via the wireless interface to the communication device and to the further communication device, a further control message. The further control message indicates the selected time-frequency resource block of the radio resources. The further control message prompts the further communication device to mute transmission in a time-frequency resource block on the radio resources on the channel. The further control message further prompts the communication device to send the data packet of the first class of data employing the time-frequency resource block of the radio resources on the channel.

According to various embodiments, a computer readable storage medium is provided. The computer readable storage medium comprises program code to be executed by at least one processor of a network device of a wireless network, wherein execution of the program code causes the at least one processor execute a method comprising controlling a memory to store information indicating radio resources on a channel of a wireless network. The radio resources are reserved for a first class of data and for a second class of data. The radio resources are shared between a communication device and a further communication device. The method further comprises the at least one processor receiving, via a wireless interface, a control message. The control message prospectively indicates a time-frequency resource block of the radio resources. The control message further prompts the communication device to mute transmission in the indicated time-frequency resource block on the channel. The method further comprises the at least one processor retrieving the stored information from the memory. The method further comprises the at least one processor controlling the wireless interface to mute transmission in the indicated time-frequency resource block on the channel in response to said receiving of the control message.

According to various embodiments, a computer readable storage medium is provided. The computer readable storage medium comprises program code to be executed by at least one processor of a network device of a wireless network, wherein execution of the program code causes the at least one processor execute a method comprising controlling a memory to store information. The information indicates first radio resources on a channel of a wireless network. The first radio resources are reserved for a first class of data. The information further indicates second radio resources on the channel. The second radio resources are reserved for a second class of data. The first radio resources are shared between a communication device and a further communication device. The method further comprises the at least one processor retrieving the stored information from the memory and selecting between the first radio resources and the second radio resources for sending of a data packet of the second class of data. Said selecting depends on a traffic load on the channel in the second radio resources. The method further comprises the at least one processor sending, via the wireless interface on the channel, the data packets of the second class of data employing the first radio resources if the first radio resources are selected.

According to various embodiments, a computer readable storage medium is provided. The computer readable storage medium comprises program code to be executed by at least one processor of a network device of a wireless network, wherein execution of the program code causes the at least one processor execute a method comprising the at least one processor prospectively allocating, on a channel of the wireless network and in a shared manner, radio resources. The radio resources are reserved at least for a first class of data to a communication device and to a further communication device. The method further comprises the at least one processor receiving, via a wireless interface from the communication device, a control message. The control message prospectively indicates a need of the communication device sending a data packet of the first class of data employing the radio resources. The method further comprises the at least one processor selecting a time-frequency resource block of the radio resources for said sending of the data packet of the first class of data by the communication device. The method further comprises the at least one processor sending, via the wireless interface to the communication device and to the further communication device, a further control message. The further control message indicates the selected time-frequency resource block of the radio resources. The further control message prompts the further communication device to mute transmission in a time-frequency resource block on the radio resources on the channel. The further control message further prompts the communication device to send the data packet of the first class of data employing the time-frequency resource block of the radio resources on the channel.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

The foregoing and additional features and effects of the invention will become apparent from the following detailed description when read in conjunction with the accompanying drawings, in which like reference numerals refer to like elements.

DETAILED DESCRIPTION

Figure 1:
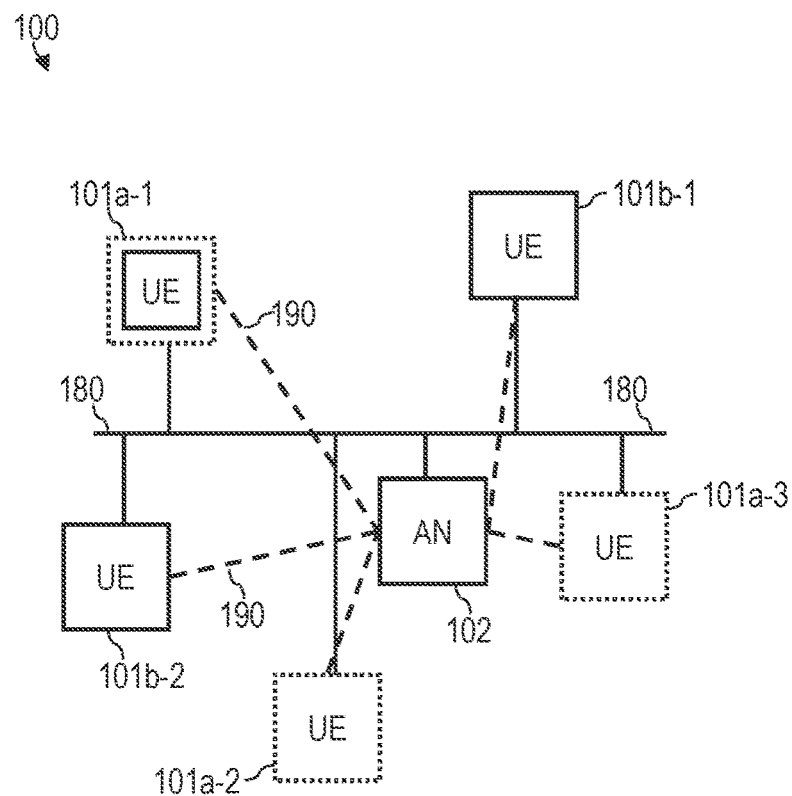
FIG. 1 is an illustration of a critical machine-type communication network supporting transmission of a first class of data, i.e., event-triggered data, and transmission of a second class of data, i.e., best-effort data, via a unicast transmission and/or a broadcast transmission on a channel according to various embodiments, the critical machine-type network comprising an access node and a plurality of communication devices.
Figure 1:

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques are illustrated which enable to transmit data traffic of a first class of data and traffic of a second class of data employing radio resources. Generally, the radio resources may be shared between a first communication device and a second communication device and/or further communication devices (shared radio resources). Thus, the channel may be shared between the communication devices. The first class of data may have a higher transmission priority than the second class of data. The transmission priority may be defined in the framework of a Quality of Service (QoS); thus, generally, QoS requirements may be stricter for the first class of data than the second class of data. The techniques allow achieving reliable transmission while, at the same time, enabling low-latency transmission. Hence, a likelihood of lost data packets may be comparably low.

According to various scenarios, the need of signalling a data packet of the first class of data is prospectively indicated. This signalling may be implemented even though radio resources on the channel may be available to the sending entity which radio resources are reserved for the first class of data. This allows re-using the radio resources reserved at least for the first class of data for transmission of data packets of other classes of data, e.g., of a second class of data. In particular, re-using may be possible in a situation where no data packet of the first class of data has been indicated; at the same time, if the data packet of the first class of data has to be transmitted, i.e., when there is a need of transmitting the data packet of the first class of data, collision with data packets of the second class of data may be avoided by the prospectively indicating. Also, collision with other data packets of the first class of data, e.g., sent by other sending entities, may be avoided. Thus, the prospectively indicating allows other devices to become pre-emptively aware of the presence of the data packet of the first class of data and block or mute their transmissions.

Generally, such techniques as illustrated above and illustrated below at greater detail may find application in various network technologies, e.g., according to the Third Generation Partnership (3GPP) Long Term Evolution (LTE) radio access technology. In some scenarios, such techniques may be applied in critical machine-type communication (MTC) networks.

In FIG. 1, an MTC network 100 is shown. The MTC network 100 comprises communication devices (UEs) 101a-1, 101a-2, 101a-3, 101b-1, 101b-2 and an access node 102. The access node 102 centrally establishes a cell. The MTC network 100 may also be referred to as a centralized system for industrial automation as the MTC network 100, in the scenario of FIG. 1, comprises a single centre-excited cell. The size of the cell may correspond to around 50-250 meters, preferably approximately 100 meters.

The MTC network 100 of FIG. 1 relies on the 3GPP LTE radio access technology or a modification thereof. While hereinafter reference will be primarily made to scenarios relying on the 3GPP LTE radio access technology, it is also possible that other radio access technologies are employed, e.g., the Universal Mobile Telecommunications System (UMTS) radio access technology as specified by the 3GPP. As mentioned above, it is, in particular, possible to employ the techniques for certain enhancements of the LTE radio access technology; e.g., a transmission time interval or orthogonal frequency-division multiplexing symbol length may be scaled down in the access technologies applied according to various embodiments—e.g., if compared to the LTE radio access technology, by a factor of five or ten.

From FIG. 1 it can be seen that the MTC network 100 supports, both, broadcast transmission 180 (shown in FIG. 1 with the full line), as well as unicast transmission 190 (shown in FIG. 1 with the dashed line). Broadcast transmission 180 relates to point-to-multipoint transmission; while unicast transmission 190 relates to point-to-point transmission. The broadcast transmission 180 is typically directed to all other devices forming the MTC network 100; however, it is also possible that the broadcast transmission 180 is directed to a subset of all devices forming the MTC network 100.

For the unicast transmission 190 and/or the broadcast transmission 180 at least of payload data, the UEs 101a-1, 101a-2, 101a-3, 101b-1, 101b-2 and the access node 102 may share a channel of the MTC network 100. The channel may comprise time-frequency resource blocks that are defined in time and/or frequency. Generally, the channel may be an uplink (UL) channel. In case of the 3GPP LTE radio access technology, the channel may correspond to the Physical UL Shared Channel (PUSCH) which is employed for transmitting user-plane data or payload data of higher layer protocols.

For the unicast transmission 190 and/or the broadcast transmission 180 of control messages, the MTC network 100 may provide at least one dedicated control channel. The control channel may be uniquely allocated to each one of the UEs 101a-1, 101a-2, 101a-3, 101b-1, 101b-2. Thereby, collisions between different UEs 101a-1, 101a-2, 101a-3, 101b-1, 101b-2 sending control messages may be avoided. However, it is alternatively or additionally also possible that a control channel is implemented which comprises shared radio resources allocated to more than one UE 101a-1, 101a-2, 101a-3, 101b-1, 101b-2; in particular in such a scenario, the broadcast transmission 180 may be employed.

To reduce a likelihood of collisions, radio resources on the channel may be reserved for certain classes of data, e.g., distinctly to a specific class of data or to more than one class of data. Radio resources may be defined as a set of time-frequency resource blocks. Reserving radio resources may correspond to a technique where, at some point in time, radio resources are reserved for a future period of time. Generally, it is possible that the reserved radio resources are reoccurring, i.e., from time-to-time during the future time period there may be reoccurrences of the reserved radio resources. In any case, the radio resources may be shared radio resources.

The access node 102 acts as a central network manager of the MTC network 100. The access node 102 is configured to receive sensor data from sensors and to transmit the sensor data to actuators; the sensors and actuators are implemented by or coupled to the UEs 101a-1, 101a-2, 101a-3, 101b-1, 101b-2. Therefore, the access node 102 may be considered to be one-to-one attached to the UEs 101a-1, 101a-2, 101a-3, 101b-1, 101b-2 which may be also referred to as programmable logic device (PLC). The number of UEs 101a-1, 101a-2, 101a-3, 101b-1, 101b-2 shown in FIG. 1 is five; however, generally, there may be a larger number of UEs 101a-1, 101a-2, 101a-3, 101b-1, 101b-2 connected to the MTC network 100, e.g., approximately thirty. There may be more than one access node 102.

The MTC network 100 may impose comparably strict requirements in terms on reliability and delay, respectively latency, on the transmission 180, 190 of data. In particular, in the MTC network 100 according to FIG. 1, support for coexistence between the first class of data and the second class of data is provided.

E.g., the first class of data may be event-triggered data; the second class of data may be best-effort data. Hereinafter, reference will be made primarily to the first class of data as event-triggered data and to the second class of data as best-effort data; however, generally, it is possible that the first and second classes of data correspond to different types or kinds of data.

The best-effort data and/or the event-triggered data may be sent from the UEs 101a-1, 101a-2, 101a-3, 101b-1, 101b-2 to the access node 102 in an UL transmission and/or to remaining UEs 101a-1, 101a-2, 101a-3, 101b-1, 101b-2 in a device-to-device (D2D) transmission. Typically, the event-triggered data and/or the best-effort data is sent via the unicast transmission 190 from a given UE 101a-1, 101a-2, 101a-3, 101b-1, 101b-2 to the access node 102.

The event-triggered data may correspond to high-priority data—in particular if compared to the best-effort data. E.g., a QoS requirement of latency and/or priority may be stricter for the event triggered data than for the best-effort data. The event-triggered data may correspond to exceptional messages, sporadic messages such as emergency messages or the like, etc. The event-triggered data may be triggered by an event, e.g., by an exceptional or unforeseeable event. In FIG. 1, the UEs 101a-1, 101a-2, 101a-3 are capable of sending the event-triggered data.

The best-effort data may be associated with reoccurring traffic; in particular, the best-effort data may be periodically reoccurring, e.g., at a given periodicity or distribution of periodicities This is why sometimes the best-effort data is also referred to as periodic data. Such best-effort data may correspond to status updates, measurement values periodically indicated, etc. In FIG. 1, the UEs 101b-1, 101b-2 are capable of sending the best-effort traffic. In particular, the UEs 101b-1, 101b-2 are configured to send, in a reoccurring manner, the best-effort traffic. In the scenario of FIG. 1, the UEs 101b-1, 101b-2 are actuators and sensors of the MTC network 100.

Generally, it is possible that the communications devices 101a-1, 101a-2, 101a-3, 101b-1, 101b-2 are capable of sending best-effort data and/or event-triggered data. In particular, in the scenario of FIG. 1, the UE 101a-1 is capable of sending, both, best-effort and event-triggered data.

In various scenarios, it is possible to define groups of UEs 101a-1, 101a-2, 101a-3, 101b-1, 101b-2 sharing resources on the channel depending on a capability of sending the event-triggered data and the best-effort data as indicated by the UEs 101a-1, 101a-2, 101a-3, 101b-1, 101b-2 in a capability control message. Here, it is possible to group such UEs 101a-1, 101a-2, 101a-3, 101b-1, 101b-2 which have differing capabilities in terms of sending best-effort data and event-triggered data. E.g., it is possible to group such UEs 101a-1, 101a-2, 101a-3, 101b-1, 101b-2 that are not capable of sending event-triggered data with such UEs 101a-1, 101a-2, 101a-3, 101b-1, 101b-2 that are capable of sending event-triggered data. UEs 101a-1, 101a-2, 101a-3, 101b-1, 101b-2 of a group may be configured to share resources on the channel reserved at least for the event-triggered data. In particular, UEs 101a-1, 101a-2, 101a-3, 101b-1, 101b-2 of a group may be configured to re-use the resources on the channel reserved at least for the event-triggered data for sending of data packets of the best-effort data. The grouping UEs 101a-1, 101a-2, 101a-3, 101b-1, 101b-2 and/or allocation of the radio resources may be executed by the access node 102. Such techniques of grouping allow reducing the latency of transmission while preserving a low likelihood of collisions, as will be explained in greater detail hereinafter.

The capability control message may be sent via the unicast transmission 190 and/or the broadcast transmission 180. The channel may be employed for transmission; alternatively or additionally, the control channel may be employed for transmission of the capability control message.

According to reference implementations such as wirelessHART and ISA100.11.a, the coexistence of the best-effort data and event-triggered data is handled in a way that does not fulfil strict latency requirements. Namely, such techniques according to reference implementations are typically based on IEEE 802.15.4-2006 and employ a frame-based approach: Here, data transmission relies on a time-series of transmission frames. In the reference implementations, typically each frame is sub-divided in two phases, a contention free phase and a contention based phase. Then, according to the reference implementations, the best-effort data is scheduled in the contention free phase where scheduling is assisted by a network manager; the event-triggered data is scheduled in the contention based phase. There is no priority in transmission for event-triggered data over best-effort data. E.g., in the reference implementations the following scenario may occur: where an event-triggered emergency message is generated during the contention free phase or transmission of the emergency message fails during the contention based phase, (re-)transmission is delayed until the next contention-based period or the next frame, respectively. Thus, latency is comparably high.

Below, techniques according to various embodiments are described which—at least if compared to the above-mentioned scenario—allow to reduce the latency in particular for transmission of the event-triggered data while, at the same time, a high transmission reliability may be achieved. The techniques as described below allow implementing data transmission having a latency of 1 ms or less and a transmission reliability of 1E-9 or better. These techniques are based on the finding that in MTC networks it is generally likely that event-triggered data is scheduled for transmitting less frequently than best-effort data; this is particularly true if the grouping, as mentioned above, of UEs sharing radio resources depends on their capability of sending the event-triggered data and the best-effort data, respectively. These techniques are further based on the finding that in MTC networks 100 allocation of strictly separate bandwidth to best-effort data on the one hand, and event-triggered data on the other hand is comparably inefficient in terms of spectral efficiency; rather, re-using of radio resources allows increasing the spectral efficiency.

The techniques as illustrated in detail hereinafter rely on prioritization of scheduling of event-triggered data over best-effort data. When a UE 101a-1, 101a-2, 101a-3, 101b-1, 101b-2 requires to send event-triggered data, transmission of, best-effort data and/or event-triggered data by other UEs 101a-1, 101a-2, 101a-3, 101b-1, 101b-2 of the MTC network 100 is blocked or muted. This allows freeing up the radio resources for the transmission of the event-triggered data.

According to various embodiments, the respective UE 101a-1, 101a-2, 101a-3, 101b-1, 101b-2 is configured to send a control message which prospectively indicates the need to send a data packet of the event-triggered data. E.g., this sending may be in response to the data packet of the event-triggered data being scheduled for transmission in a transmit buffer of the respective UE 101*a*-1, 101*a*-2, 101*a*-3, 101*b*-1, 101*b*-2. This sending may alternatively or additionally be in response to an event generating the event-triggered data occurring.

Generally, the control message may be sent on the channel. It is also possible that the control message is sent on the control channel.

The control message may be sent via the unicast transmission 190 to a dedicated further UE 101*a*-1, 101*a*-2, 101*a*-3, 101*b*-1, 101*b*-2 and/or to the access node 102. Alternatively or additionally, the control message may be sent via the broadcast transmission 190. The control message may be sent employing the control channel comprising dedicated radio resources and/or may be sent employing the radio resources on the channel reserved at least for the event-triggered data. E.g., if a control channel is employed, in case of the 3GPP LTE radio access technology, the Physical UL Control Channel (PUCCH) may be employed.

The control message may further prompt the further UEs 101*a*-1, 101*a*-2, 101*a*-3, 101*b*-1, 101*b*-2 to mute transmission on the channel. In particular, the further UEs 101*a*-1, 101*a*-2, 101*a*-3, 101*b*-1, 101*b*-2 may thereby be prevented from sending best-effort data while the data packet of the event-triggered data is being transmitted. Thus, it becomes possible to share the radio resources on channel between the UEs 101*a*-1, 101*a*-2, 101*a*-3, 101*b*-1, 101*b*-2 while a risk of collisions may be reduced.

Generally, the radio resources on the channel may be reserved solely to the event-triggered data; however, it is also possible that the radio resources on the channel are reserved to the event-triggered data, as well as to the best-effort data. If the radio resources on the channel are reserved solely to the event-triggered data, it may be possible that further radio resources exist that are reserved for the best-effort data, e.g., solely reserved for the best-effort data. Hence, it may be possible that the radio resources on the channel shared between the UEs 101*a*-1, 101*a*-2, 101*a*-3, 101*b*-1, 101*b*-2 comprise distinct first and second radio resources; the first and second radio resources may be reserved for the event-triggered data and the best-effort data, respectively.

In any case, it may be possible that the UEs 101*a*-1, 101*a*-2, 101*a*-3, 101*b*-1, 101*b*-2 employ radio resources on the channel reserved for the event-triggered data (first radio resources) for transmission of the best-effort data, as well. In other words, the first radio resources may be re-used for sending of data packets of the best-effort data. This allows reducing the latency for sending of the best-effort data.

Such a hybrid approach which relies on re-using resources allows coexistence of the best-effort data and the event-triggered data on the channel while fulfilling latency and reliability requirements. E.g., the UEs 101*a*-1, 101*a*-2, 101*a*-3, 101*b*-1, 101*b*-2 may be configured to re-use the first radio resources for data packets of the best-effort data in case of a high traffic load where, e.g., all available radio resources reserved for the best-effort data on the channel (second radio resources) are busy.

It is possible that the first radio resources are allocated to two or more UEs 101*a*-1, 101*a*-2, 101*a*-3, 101*b*-1, 101*b*-2 in a shared manner. Alternatively or additionally, it is possible that the second radio resources are allocated to two or more UEs 101*a*-1, 101*a*-2, 101*a*-3, 101*b*-1, 101*b*-2 in a shared manner.

Generally, the second radio resources may be reserved as well. Generally, the second radio resources may be orthogonal in time and/or frequency to further radio resources, e.g., radio resources on the control channel and/or the first radio resources. Generally, the UEs 101*a*-1 101*b*-1, 101*b*-2 that are capable of sending the best-effort data may be configured to select between the first radio resources and the second radio resources for sending of a data packet of the best-effort data depending on a traffic load on the channel in the second radio resources. Then, the UEs 101*b*-1, 101*b*-2 may be configured to send the data packet of the best-effort data employing the first radio resources if the first radio resources are selected. At the same time, however, if the control message prompts to mute transmission of the best-effort data, this may be taken into account when selecting between the first radio resources and the second radio resources as well. When judging the traffic load, it is generally possible to take into consideration a predefined traffic threshold. If, e.g., the traffic on the channel falls below the predefined traffic threshold, it is possible to rely on the second radio resources for sending of the data packet of the best-effort data. E.g., in the exceptional circumstance that the traffic in the second radio resources exceeds the predefined traffic threshold, the first radio resources may be re-used for sending of the data packet of the best-effort data. This allows controlling re-usage of the first radio resources for sending of best-effort traffic to the necessary extent, i.e., as a fallback solution. Thereby, collisions may be avoided.

Figure 2:
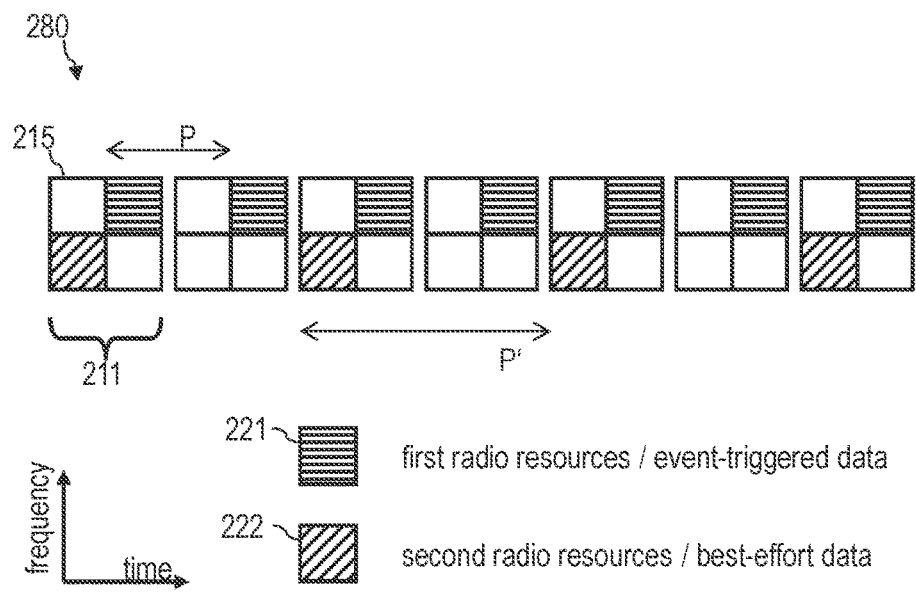
FIG. 2 is a schematic representation of first radio resources and second radio resources reserved on the channel for the event-triggered data and the best-effort data, respectively, according to various embodiments.

In FIG. 2, the first radio resources 221 and the second radio resources 222 are illustrated schematically over the course of time (horizontal axis in FIG. 2) and frequency (vertical axis in FIG. 2) on the channel 280. As can be seen from FIG. 2A, distinct radio resources 221, 222 are allocated for transmission of the event-triggered data and the best-effort data. However, as mentioned above, if certain criteria are met it is possible to re-use the first radio resources 221 for the transmission of a data packet of the best-effort data.

Transmission on the channel 280 is subdivided in frames 211; if compared to subframes of the 3GPP LTE scenario, the frames 211 may have a shorter duration of only 0.2 ms, i.e., scaled down by a factor of five. Frames 211 may be scaled to by a larger factor, e.g., by a factor of ten. Each frame 211 comprises a number of time-frequency resource blocks 215. As can be seen from FIG. 2, the first radio resources 221 are periodically reoccurring with a periodicity of P, namely every frame 211; the second radio resources 222 are periodically reoccurring with a comparably longer periodicity of P', namely every second frame 211. The radio resources 221, 222 may, however, generally be reoccurring without a strict periodicity or following a certain distribution of periodicities.

Figure 3:
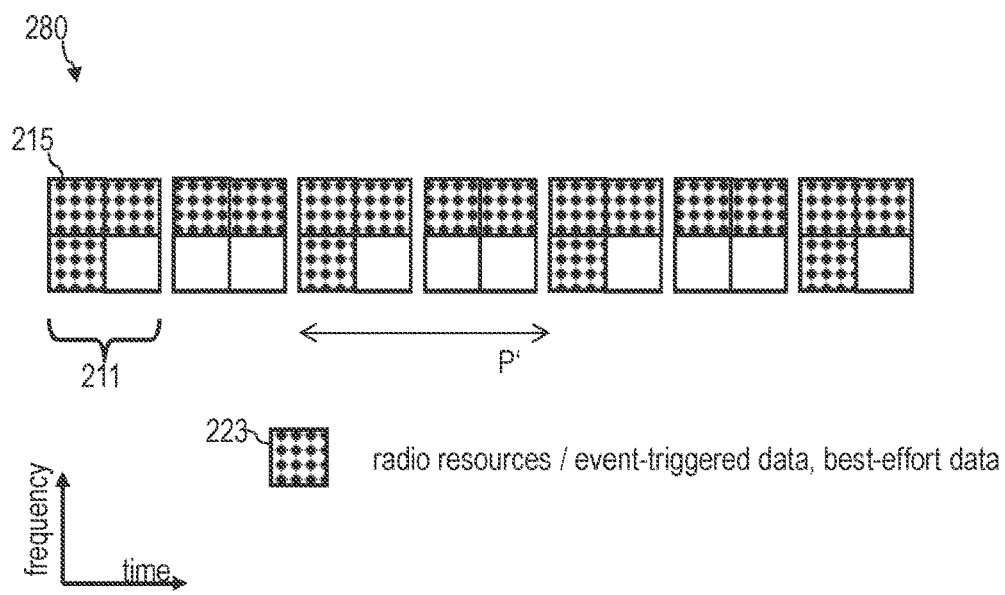
FIG. 3 is a schematic representation of radio resources reserved on the channel at least for the event-triggered data and optionally for the best-effort data according to various embodiments.

Generally, it is even possible that a certain frequency band is contiguously reserved for the event-triggered data and/or the best-effort data, cf. FIG. 3.

In the scenario of FIG. 3, there are no distinct first and second radio resources 221, 222 reserved for the event-triggered data and the best-effort data; instead, the radio resources 223 in the scenario of FIG. 3, are allocated for transmission of, both, the best-effort data and the event-triggered data. Such techniques may also be applied in scenarios according to FIG. 2.

Generally, the radio resources 221, 222, 223 may be prospectively allocated to the UEs 101*a*-1, 101*a*-2, 101*a*-3, 101*b*-1, 101*b*-2 employing scheduling control messages transmitted from the access node 102 to the UEs 101*a*-1, 101*a*-2, 101*a*-3, 101*b*-1, 101*b*-2 in a downlink (DL) transmission. If there are distinct first radio resources 221 and second radio resources 222, there may be distinct scheduling control messages, as well.

The scheduling control messages may be sent on the channel and/or on the control channel. The scheduling control messages may be sent via the broadcast transmission 180 and/or via the unicast transmission 190.

The scheduling may be centrally controlled by the access node 102. The access node 102 may send the scheduling control message(s) via the unicast transmission 190 and/or the broadcast transmission 180, e.g., in an initial set-up phase. For sending of the scheduling control message(s), a DL control channel may be employed, e.g., in case of the 3GPP LTE radio access technology the Physical DL Control Channel (PDDCH). Thus, the scheduling control message(s) may indicate the pre-scheduled or reserved radio resources.

The reservation of the first radio resources 221 and/or the second radio resources 222 may be accompanied by techniques of link adaptation to allocate appropriate time-frequency resources blocks 215 depending on the conditions of the channel 280. The periodicity P, P' of the radio resources 221, 222 typically depends on a traffic pattern and a validity of grants. The number of time-frequency resource blocks 215 may be adapted based on the conditions of the channel 280, an interference pattern, etc. Generally, the amount of resources may be estimated on various parameters, e.g., a number of UEs 101a-1, 101a-2, 101a-3, 101b-1, 101b-2 connected to the MTC network 100; and/or a quality of the channel 280 as reported by the UEs 101a-1, 101a-2, 101a-3, 101b-1, 101b-2; and/or a duration of a frame 111.

Thus, it is possible that the UEs 101a-1, 101a-2, 101a-3, 101b-1, 101b-2 are configured to receive, from the access node 102 via the unicast transmission 190 or the broadcast transmission 180, the scheduling control message which prospectively indicates at least parts of the radio resources 221, 222, e.g., the first radio resources 221 and/or the second radio resources 222. Likewise, it is generally possible that the access node 102 is configured to send, to one or more UEs 101a-1, 101a-2, 101a-3, 101b-1, 101b-2 via the unicast transmission 190 or the broadcast transmission 180, said scheduling control message.

Figure 4:
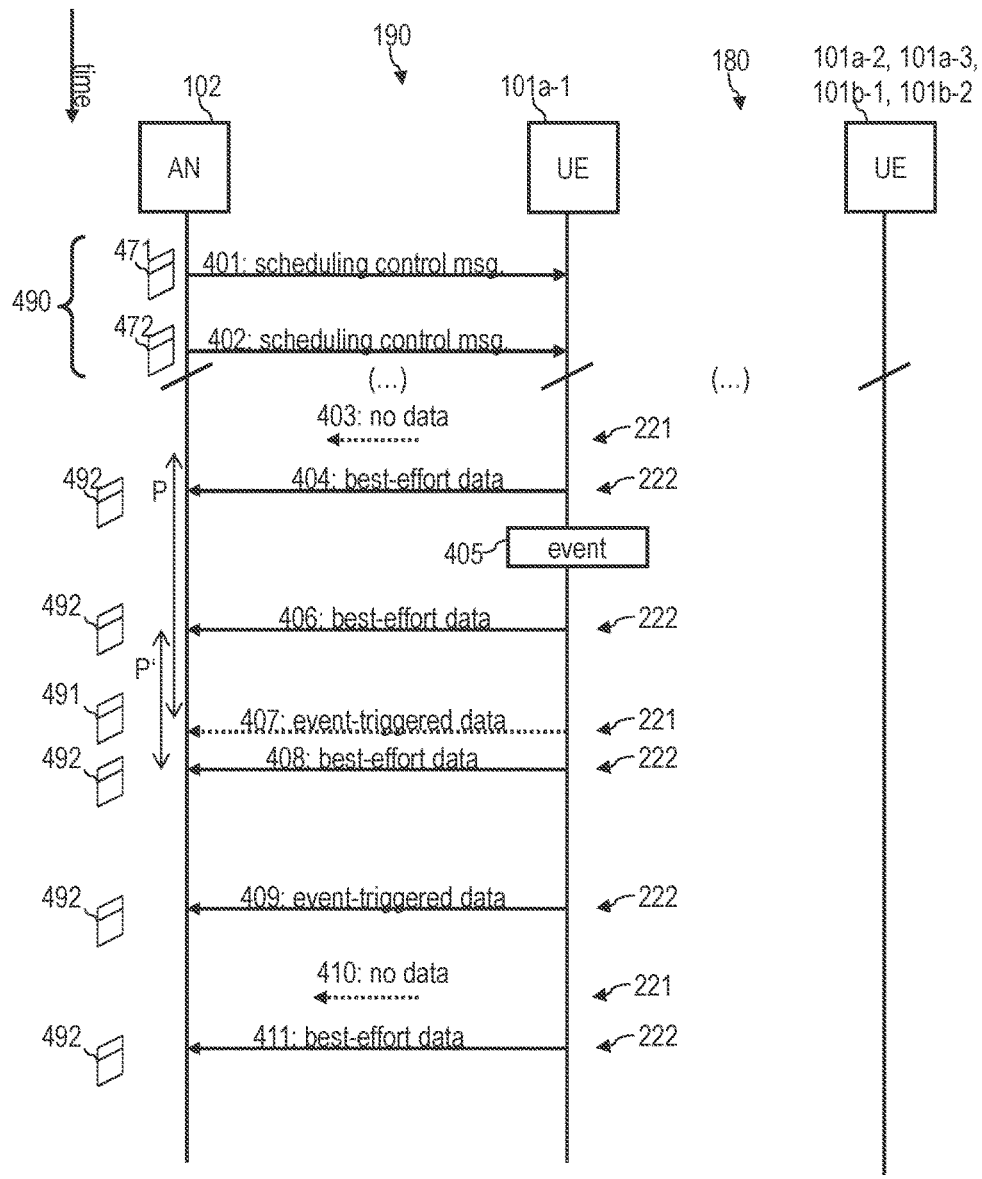
FIG. 4 is a signalling diagram of sending of a data packet of the event-triggered data from one of the communication devices to the access node via the unicast transmission according to various embodiments.

In FIG. 4, a signalling diagram is shown. At 401, the access node 102 sends in DL direction a first scheduling control message 471 to the UE 101a-1. The first scheduling control message 471 prospectively indicates the first radio resources 221. Then, at 402, the access node 102 sends a second scheduling control message 472 to the UE 101a-1. The second scheduling control message 472 prospectively indicates the second radio resources 222. In the scenario of FIG. 4, the scheduling control messages 471, 472 are sent via the unicast transmission 190. A DL control channel is employed at 401, 402. Sending of the scheduling control messages 471, 472 occurs in an initial set-up phase 490.

Then, some time after the initial set-up phase 490 has ended, the MTC network 100 operates in a state where data transmission of data packets of the event-triggered data and the best-effort data is generally possible. At 403, first radio resources 221 that are reserved occur; yet, no data packets are actually sent. Again, at 410, the first radio resources 221 are not employed for transmission. Padding may be employed.

Differently, at 404 a data packet 492 of best-effort data is sent employing the second radio resources 222. Also at 406, 408, 409, 411 data packets 492 of best-effort data are sent employing the second radio resources 222. At 404, 406, 408, 409, 411, UL transmission on the channel 280 occurs via the unicast transmission 190.

At some point in time, an event 405 occurs. E.g., a warning may be triggered or some value of a PLC may cross a predefined threshold, etc. Thus, a data packet 491 of the event-triggered data is generated and eventually sent at 407 on the channel 280 via the unicast transmission 190 to the access node 102 in the UL direction. E.g., the data packet 491 may carry an emergency message or the like.

In the scenario of FIG. 4, the data packets 491 of the event-triggered data and the data packets 492 of the best-effort data are sent via the unicast transmission 190 to the access node 102. Generally, the data packets 491 and/or the data packets 492 could alternatively or additionally be sent via the broadcast transmission 180 (not shown in FIG. 4).

As can be seen from the above, at 403 and 410, unused first radio resources 221 occur. The respective bandwidth is not used for payload data transmission. This is why at 403, 410 the UE 101a-1 is configured to check whether there is best-effort data to be transmitted; however, at 403, 410 the UE 101a-1 determines that—while there may be best-effort data to be transmitted, e.g., scheduled for transmission in an UL transmission buffer—the traffic load on the channel 280 in the second radio resources 222 is below a certain predefined traffic threshold; thus the UE 101a-1 selects the second radio resources 222 for transmission of the data packets 492 of the best-effort data at 404 and 411, respectively. Because of this, the otherwise unused first radio resources 221, 222 are not being re-used for transmission of the best-effort data.

As can be seen from the above, in principle it is possible to re-use the first radio resources 221 for sending of best-effort data. This may be, however, selectively triggered depending on the traffic load on the second radio resources 222 as a fall-back solution.

The first radio resources 221 and the second radio resources 222 are shared between the UEs 101a-1, 101a-2, 101a-3, 101b-1, 101b-2. Further, the first radio resources 221 may be re-used for transmission of best-effort data. Thus, in a scenario as explained with respect to FIG. 4, collisions may occur. E.g., a situation may occur where best-effort data is sent employing the first radio resources 221 another UE 101a-2, 101a-3, 101b-1, 101b-2; at the same time, the UE 101a-1 may send the data packet 491 of the event-triggered data via the channel. Thus, a collision may result. Techniques are described which enable to reduce the likelihood of collisions.

Figure 5:
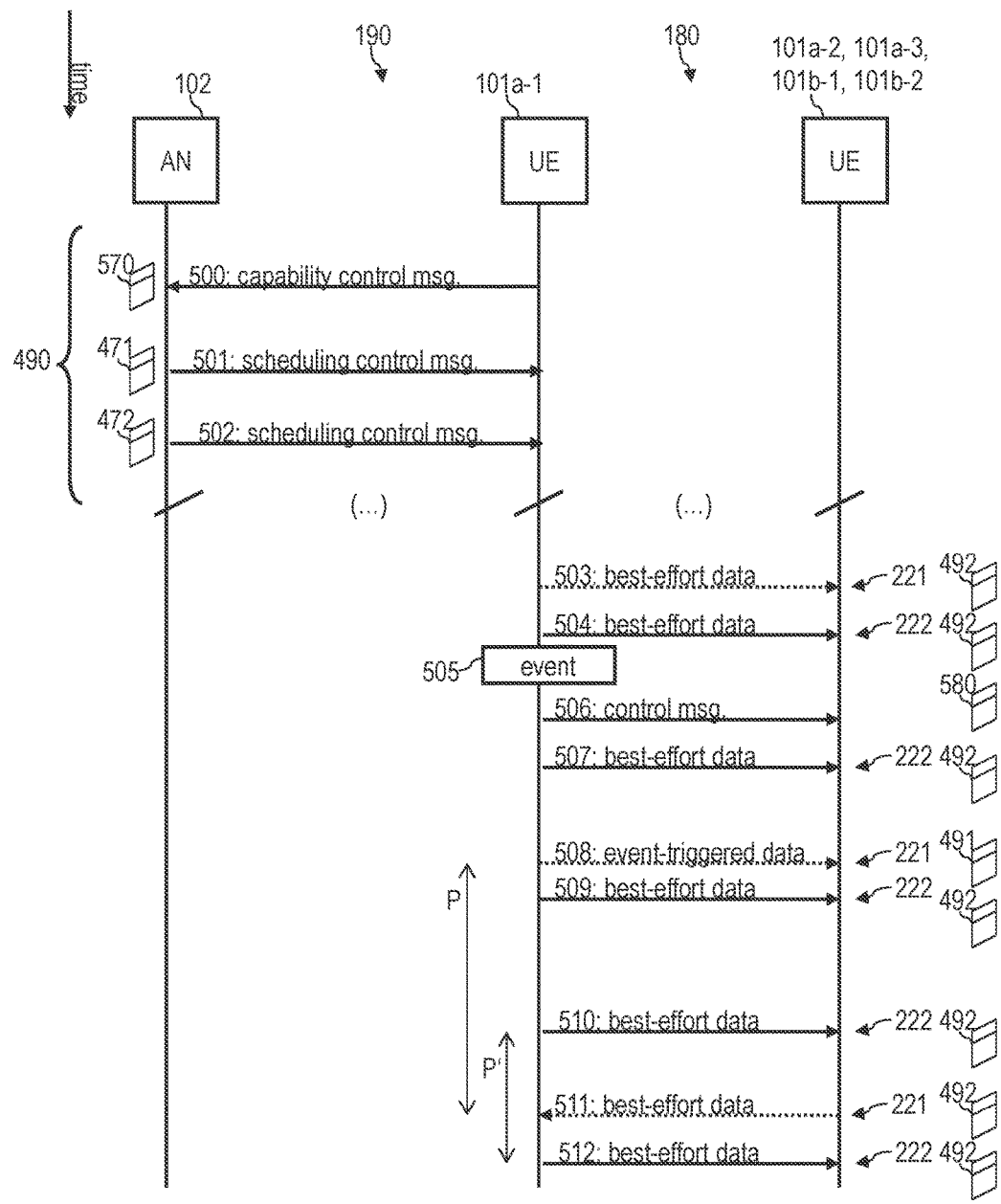
FIG. 5 is a signalling diagram of sending of a data packet of the event-triggered data via the broadcast transmission employing the first radio resources and of sending of a data packet of the best-effort data via the broadcast transmission employing the first radio resources according to various embodiments.

Now referring to FIG. 5, a scenario is also conceivable where the UE 101a-1 or any other UE 101a-2, 101a-3, 101b-1, 101b-2 selects the first radio resources 221 for sending of a data packet 492 of the best-effort data and—at the same time—a likelihood of collisions is reduced. This occurs by employing on a control message 580. The control message 580 prospectively indicates the need of the UE 101a-1 sending the data packet 491 of the event-triggered data. Details of the techniques are explained hereinafter.

Namely, at 503, a data packet 492 of the best-effort data is sent employing the first radio resources 221. Here, the UE 101a-1 selects the first radio resources 221 for transmission of the data packet 492 of the best-effort data, because the traffic load on the channel 280 in the second radio resources 222 is above the predefined traffic threshold. In order to ensure low-latency delivery of that data packet, the first radio resources 221 are re-used—albeit in principle the first radio resources 221 are reserved for the transmission of the event-triggered data.

Generally, different decision criteria are conceivable which may be relied upon when checking the traffic load on the channel 280 in the second radio resources 222. E.g., it may be possible to take into account a size of the data packet 492 of the best-effort data which is to be transmitted; and/or a size of the second radio resources 222, e.g., within a certain time span; and/or a priority of the data included in the data packet 492 of the best-effort data. E.g., if—within the time span—the second radio resources 222 do not suffice to transmit the data packet 492, given its determined size, then the fallback to the first radio resources 221 may be executed. The time span may correlate with a latency requirement, e.g., according to QoS.

As can be seen from the above, the first radio resources 221 are, in principle, reserved for the event-triggered traffic. However, they can be utilized for transmission of best-effort traffic as well in case of a congested network, e.g., due to high traffic load. Best-effort data—typically corresponding to a lower transmission priority—is scheduled employing the first radio resources 221 in such a case; due to the low priority of the best-effort data, such transmission can be blocked in case a data packet 491 of the event-triggered data needs to be transmitted. This is achieved by means of the control message 580.

The control message 580 implements a collision avoidance mechanism. The scenario of FIG. 5 corresponds to a D2D-assisted solution of the collision avoidance mechanism to prioritize scheduling of data packets 491 of the event-triggered data over data packets 492 of the best-effort data. Because at 503 no control message 580 has been received by the UE 101a-1, the UE 101a-1 is free to send the data packet 492 of the best-effort data employing the first radio resources. In other words, selecting between the first radio resources 221 and second radio resources 222 generally may depend on whether or not the control message 580 has been received.

In this regard, e.g. at 505, an event occurs and event-triggered data is generated. Thus, the UE 101a-1 has event-triggered data to schedule for UL transmission; therefore, at 506, the UE 101a-1 sends the control message 580 which prospectively indicates the need of sending the data packet 491 of the event-triggered data. The control message 580 is sent via the broadcast transmission 180 to the remaining UEs 101a-2, 101a-3, 101b-1, 101b-2 so that the remaining UEs 101a-2, 101a-3, 101b-1, 101b-2 become aware of the presence of high-priority event-triggered traffic. Thus, the control message 580 prompts the remaining UEs 101a-2, 101a-3, 101b-1, 101b-2 to mute transmission on the channel 280 employing the first radio resources 221. Generally, the control message 580 may prompt muting of the transmission for a certain predefined time period; and/or for a certain number of predefined time-frequency resource blocks 215; and/or for specifically indicated time-frequency resource blocks 215. Optionally, also the access node 102 receives the control message 580 at 506 via the broadcast transmission 180 and/or via the unicast transmission 190 (not shown in FIG. 5).

At 506, the control message 580 is sent via a control channel. However, generally it is also possible that the control message 580 is sent via the channel 280.

Generally it is possible, but not mandatory, that the control message 580 also includes explicit or implicit information about the specific time-frequency resource block(s) 215 that the UE 101a-1 intends to use for transmission of the data packet 491 of the event-triggered data. In particular in such a scenario, the decision logic for selecting the time-frequency resource block(s) 215 for transmission of the data packet 491 may reside in the UE 101a-1. Here, the UE 101a-1 may take into account information on the frame structure on the channel 280 and the quality of the channel 280. Thus, generally the control message 580 may indicate the time-frequency resource block 215 of the first radio resources 221 and prompt the remaining UEs 101a-2, 101a-3, 101b-1, 101b-2 to mute transmission in the indicated time-frequency resource block 215. Thus, generally it may be possible that the remaining UEs 101a-2, 101a-3, 101b-1, 101b-2 are configured to select between the first radio resources 221 and the second radio resources 222 for sending of a data packet 492 of the best-effort data depending on the indicated time-frequency resource block 215.

At 504, 507, 509, 510, 512 data packets 492 of the best-effort data are conventionally sent employing the second radio resources 222.

Above and with respect to 503, a scenario has been discussed where the UE 101a-1 sends the data packet 492 of the best effort data employing the first radio resources 221. Vice versa, because the first radio resources 221 are shared radio resources, it is also possible that one or more of the remaining UEs 101a-2, 101a-3, 101b-1, 101b-2 employ the first radio resources 221 for sending of data packets 592 of the best-effort data. This occurs at 511.

As can be seen from FIG. 5, the UE 101a-1 is capable of sending, both, the best-effort data and the event-triggered data. This may be generally indicated in a capability control message 570. In the scenario of FIG. 5, the UE 101a-1 sends the capability control message 570 at 500, i.e., during the set-up phase 490; sending occurs in UL direction, e.g., employing the PUCCH. The capability control message 570 positively indicates the capability of the UE 101a-1 to generate and send the best-effort data and further positively indicates the capability of the UE 101a-1 to generate and send the event-triggered data. Generally, it is also possible to rely on two distinct messages for signalling the capability of generating and sending the best-effort data and the event triggered data, respectively.

The capability control message 570 is sent at 500 employing a dedicated control channel. Generally, the control message 570 may also be sent on the channel 280.

While the capability control message 570 has been discussed with reference to FIG. 5 above, it is also possible to employ the capability control message 570 in further embodiments.

In the scenario of FIG. 5, the data packets 491, 492 are sent via the broadcast transmission 180; however, generally, the data packets 491, 492 could be sent via the unicast transmission 190, e.g., selectively to the access node 102 (cf. FIG. 4) or any other UE 101a-2, 101a-3, 101b-1, 101b-2.

Likewise, in the scenario of FIG. 5, the control message 580 is sent via the broadcast transmission 180. This facilitates the D2D-type implementation of the collision avoidance mechanism. Yet, generally it is also possible that the control message 580 is sent via the unicast transmission 190; e.g., the control message may be directed to one or more than one or all of the remaining UEs 101a-2, 101a-3, 101b-1, 101b-2 and/or the access node 102.

Figure 6:
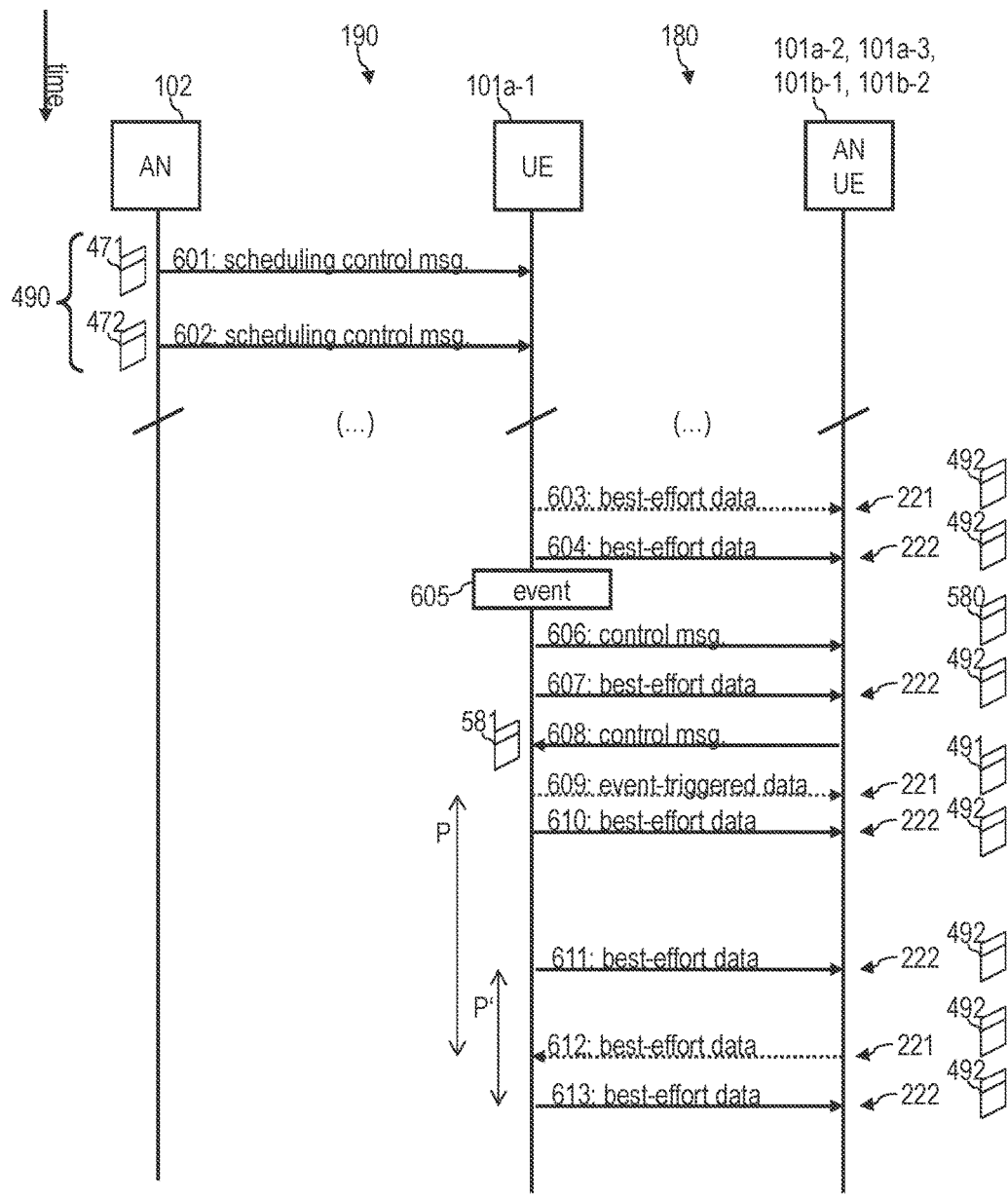
FIG. 6 is a signalling diagram of sending of a data packet of the event-triggered data via the broadcast transmission employing the first radio resources and sending of a data packet of the best-effort data via the broadcast transmission employing the first radio resources according to various embodiments.

In FIG. 6, a further scenario is illustrated. 601 and 602 correspond to 501 and 502, respectively. 603-607 correspond to 503-507, respectively; however, in the scenario of FIG. 6, the control message 580 does not indicate a time-frequency resource block 215 for the transmission of the data packet 491 of the event-triggered data. This is because in the scenario of FIG. 6 the decision logic for scheduling the transmission of the data packet 491 of the event-triggered data does not reside within the UE 101a-1, but in one of the further UEs 101a-2, 101a-3, 101b-1, 101b-2 and/or the access node 102. A further control message 581 is received by the UE 101a-1 at 608, e.g., from one of the further UEs 101a-2, 101a-3, 101b-1, 101b-2 and/or the access node 102, after sending of the control message 580; hence, the further control message 581 may be referred to as a response message. The further control message 581 can be generally sent via a dedicated control channel and/or via the channel 280. This further control message 581 indicates the time-frequency resource block 215 for sending of the data packet 491 of the event-triggered data. The further control message 581 prompts the UE 101a-1 to send the data packet 491 of the event-triggered data employing the indicated time-frequency resource block 215; the sending occurs at 609 employing the indicated time-frequency resource block 215 of the first radio resources 221. Here, the UE 101a-1 does not have to schedule sending of the data packet 491 of the event-triggered data autonomously in the first radio resources 221; instead, the EU 101a-1 can rely on the time-frequency resource block 215 as indicated in the further control message 581. Here, the decision logic for scheduling the data packet 491 of the event-triggered data resides, e.g., at the access node 201.

610-613 correspond to 509-512.

Generally, the decision logic for scheduling the data packet 491 of the event-triggered data may be shared between the UE 101a-1 and the further UEs 101a-2, 101a-2, 101b-1, 101b-3 and/or the access node 102. E.g., the control message 580 may include a plurality of candidate time-frequency resources blocks 215; then, the further control message 581 may positively or negatively acknowledge the plurality of candidate time-frequency resource blocks 215.

Figure 7:
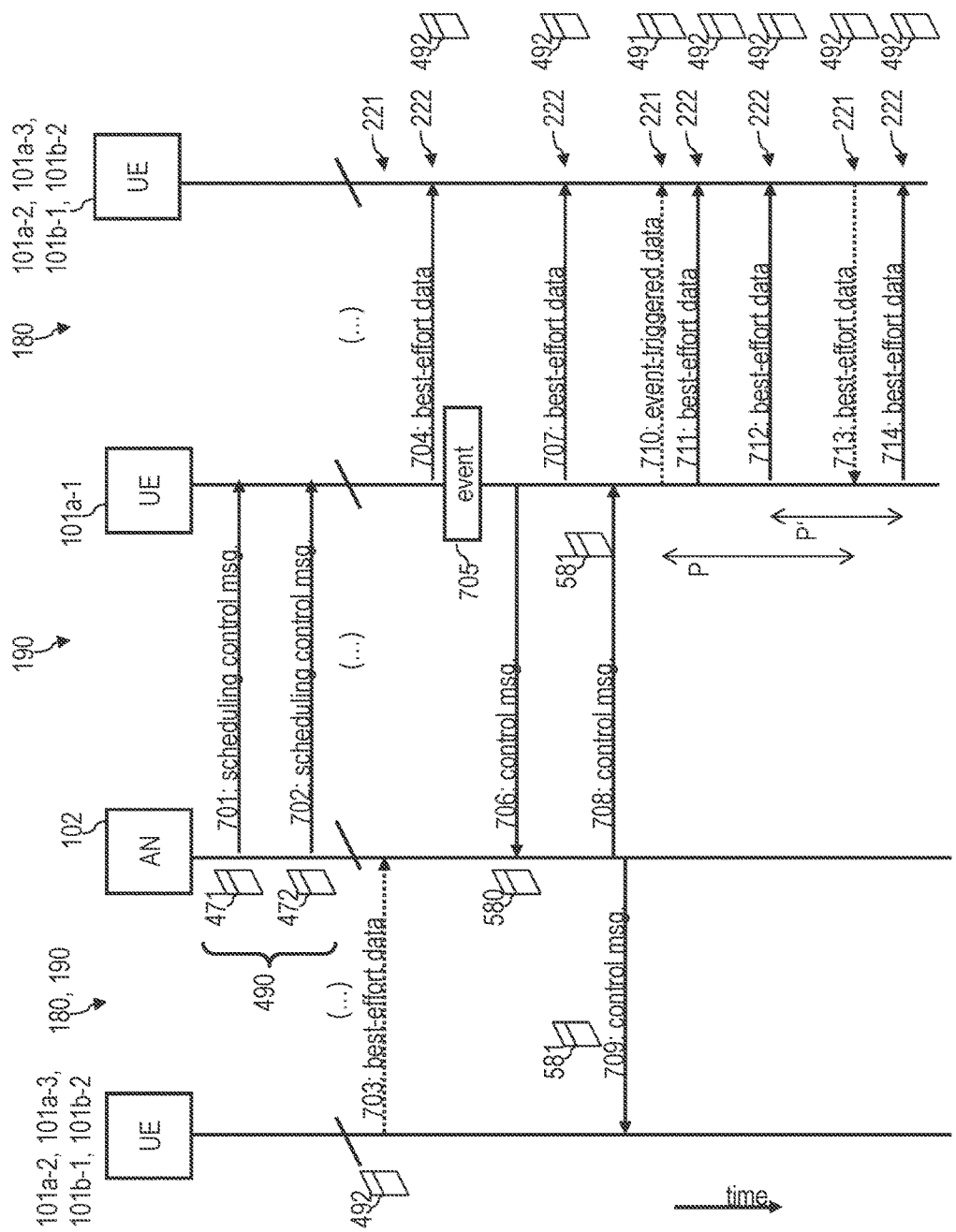
FIG. 7 is a signalling diagram of sending of a data packet of the event-triggered data via the broadcast transmission employing the first radio resources and of sending of a data packet of the best-effort data via the broadcast transmission employing the first radio resources according to various embodiments.

The scenario of FIG. 7 generally corresponds to the scenario of FIG. 6. 701 and 702 correspond to 601 and 602. However, different to FIG. 6—which implements a D2D-assisted collision avoidance mechanism—in the scenario of FIG. 7, the collision avoidance mechanism is centrally operated by the access node 102.

At 703, a data packet 492 of the best-effort data is sent via the unicast transmission 190 by one of the remaining UEs 101a-2, 101a-3, 101b-1, 101b-2; the corresponding first radio resources 221 are blocked by this transmission. If at 703, the UE 101a-1 was to send a data packet 491 of the event-triggered data via the unicast transmission 190 and/or the broadcast transmission 180 and employing the first radio resources 221, a collision would occur.

704 and 705 correspond to 604 and 605.

Differently to the scenario of FIG. 6, at 706 the control message 580 is sent to the access node 102 via the unicast transmission 190. In the scenario of FIG. 7, the decision logic for scheduling the transmission of the data packet 491 of the event-triggered data resides at the access node 102. Thus, the control message 580 at 706 is not required to include the indication of the time-frequency resource block 215 of the first radio resources 221 at which the transmission of the data packet 491 is planned.

This indication of the time-frequency resource block 215 of the first radio resources 221 at which the transmission of the data packet 491 is planned is included in the further control message 581 sent from the access node 102 via the unicast transmission 190 to the UE 101a-1 and additionally sent to the remaining UEs 101a-2, 101a-3, 101b-1, 101b-2 via the broadcast transmission 180 or the unicast transmission 190. The further control message 581 prompts the remaining UEs 101a-2, 101a-3, 101b-1, 101b-2 to mute transmission in the indicated time-frequency resource block 215. Sending of the further control message 581 via the unicast transmission 190 to the UE 101a-1 at 708 is optionally; generally the further control message 581 may be sent to all UEs 101a-1, 101a-2, 101a-3, 101b-1, 101b-2 via the broadcast transmission 180.

710-714 correspond to 609-613.

As can be seen from the above—different to the D2D-assisted solution of the collision avoidance mechanism of, e.g., FIG. 6—, in the scenario of FIG. 7 the access node 102 is involved in the scheduling.

Generally, the control message 580 and/or the further control message 581 may be sent employing an UL/DL control channel. Here, collisions may be avoided if the UL control channel and/or DL control channel does not include shared radio resources. Hence, if the UL control channel and/or DL control channel includes radio resources uniquely allocated to one of the UEs 101a-1, 101a-2, 101a-3, 101b-1, 101b-2, collisions may be avoided; this is typically the case for the unicast transmission 190. In scenarios where the control message 580 is sent employing shared radio resources—e.g., on a D2D-broadcast control channel or on the channel 280 via the radio resources 221, 222, 223—, it may be feasible to implement a collision-avoidance technique. Generally, it is possible that a Channel Sense Multiple Access with Collision Detection (CSMA/CD) technique is employed for the transmission of the control messages 580, 581. In particular, when a propagation time of the MTC network 100 is comparably small, a high efficiency of the CSMA/CD technique may be achieved; e.g., the efficiency may approach 100%.

Figure 8:
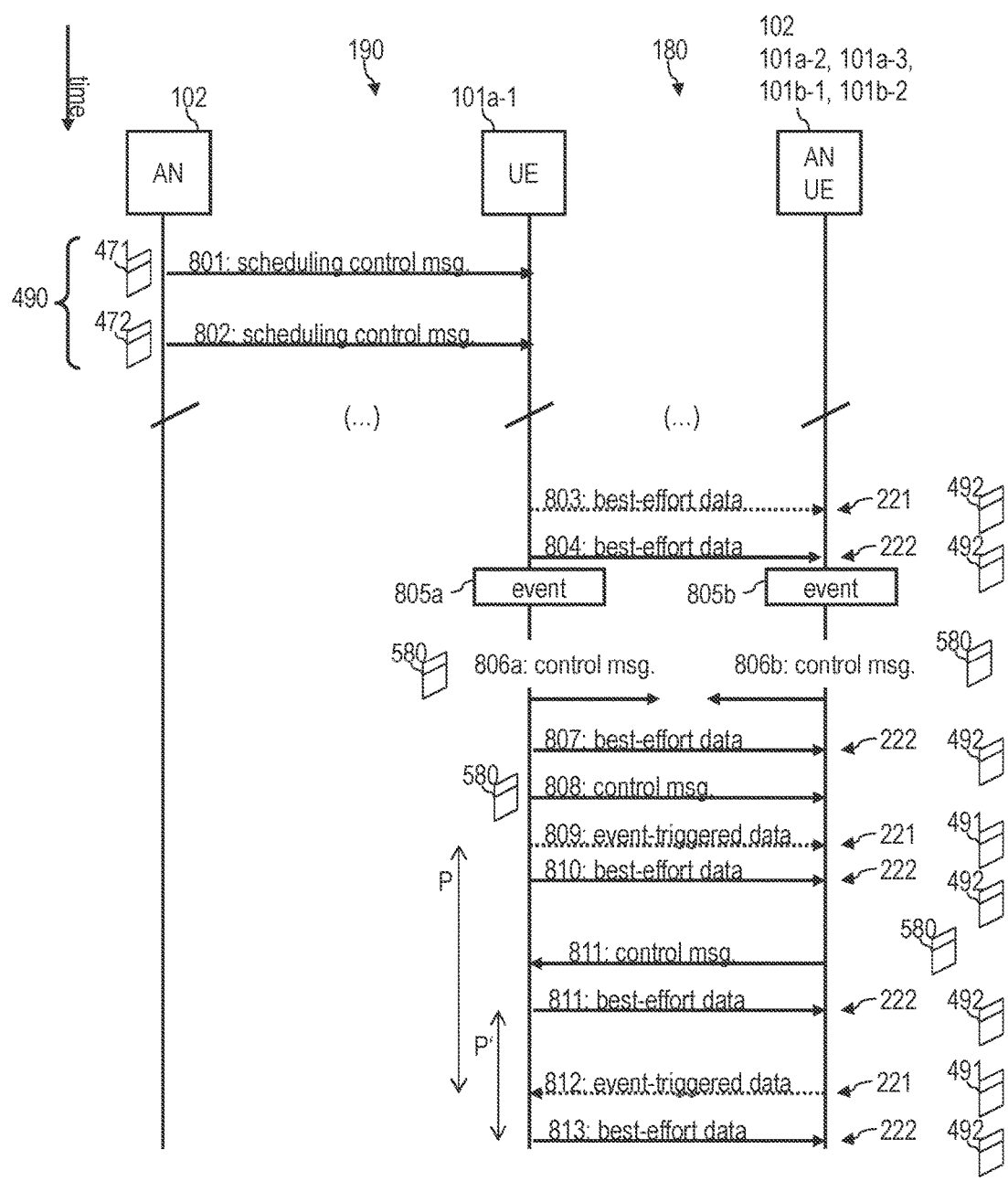
FIG. 8 is a signalling diagram of sending of a data packet of the event-triggered data via the broadcast transmission employing the first radio resources and of sending of a data packet of the best-effort data via the broadcast transmission employing the first radio resources according to various embodiments.

A collision of two control messages 580, 581 sent by different UEs 101a-1, 101a-2, 101a-3, 101b-1, 101b-2 via shared radio resources on a control channel is shown in FIG. 8, at 806a, 806b. In FIG. 8, 801-804 correspond to 601-604. At 805a and 805b events occur at the UE 101a-1 and a given one of the remaining UEs 101a-2, 101a-3, 101b-1, 101b-2, respectively, which events generate event-triggered data. The UE 101a-1 and the given one of the remaining UEs 101a-2, 101a-3, 101b-1, 101b-2 send the control message 580 via the broadcast transmission 180; a collision occurs as the control channel is shared between the UE 101a-1 and the given one of the remaining UEs 101a-2, 101a-3, 101b-1, 101b-2. According to the CSMA/CD technique, the UE 101a-1 re-transmits the control message 580 some random time later at 808; also the given one of the remaining UEs 101a-2, 101a-3, 101b-1, 101b-2 re-transmits the control message 580 some random time later at 811. Thereby, the collision is resolved. The control message 580 re-transmitted at 808 indicates the time-frequency resource block 215 for transmission of the data packet 491 at 809 employing the first radio resources. The control message 580 sent at 811 indicates the time-frequency resource block 215 for transmission of the data packet 491 at 812.

At 807, 810, 813 data packets 492 of the best-effort data are transmitted employing the second radio resources 222.

Figure 9:
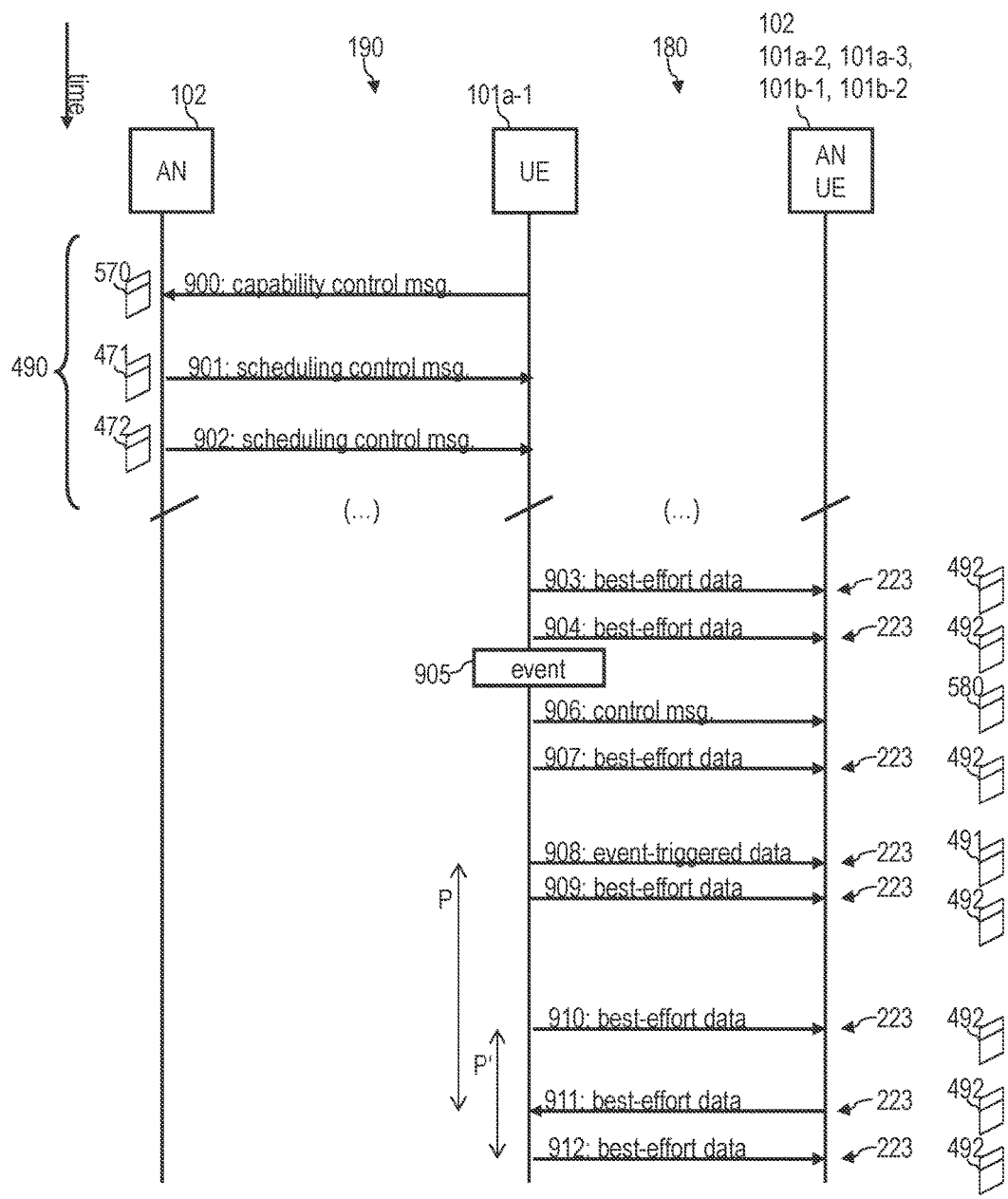
FIG. 9 is a signalling diagram of sending of a data packet of the event-triggered data via the broadcast transmission employing the first radio resources and of sending of a data packet of the best-effort data via the broadcast transmission employing the first radio resources according to various embodiments.

Above, with reference to FIGS. 4-8, scenarios have been discussed where there are first radio resources 221 dedicated primarily to transmitting of the event-triggered data and where there are second radio resources 222 dedicated primarily to transmitting of the best-effort data. In FIG. 9, a scenario is illustrated where there are no dedicated first and second radio resources 221, 222; instead, the radio resources 223 are reserved for, both, the event-triggered data and the best-effort data.

900-902 correspond to 500-502. Further, 903-912 correspond to 503-512 where, however, the radio resources 223 are employed for sending of the data packets 491, 492 of, both, the event-triggered data and the best-effort data.

Figure 10:
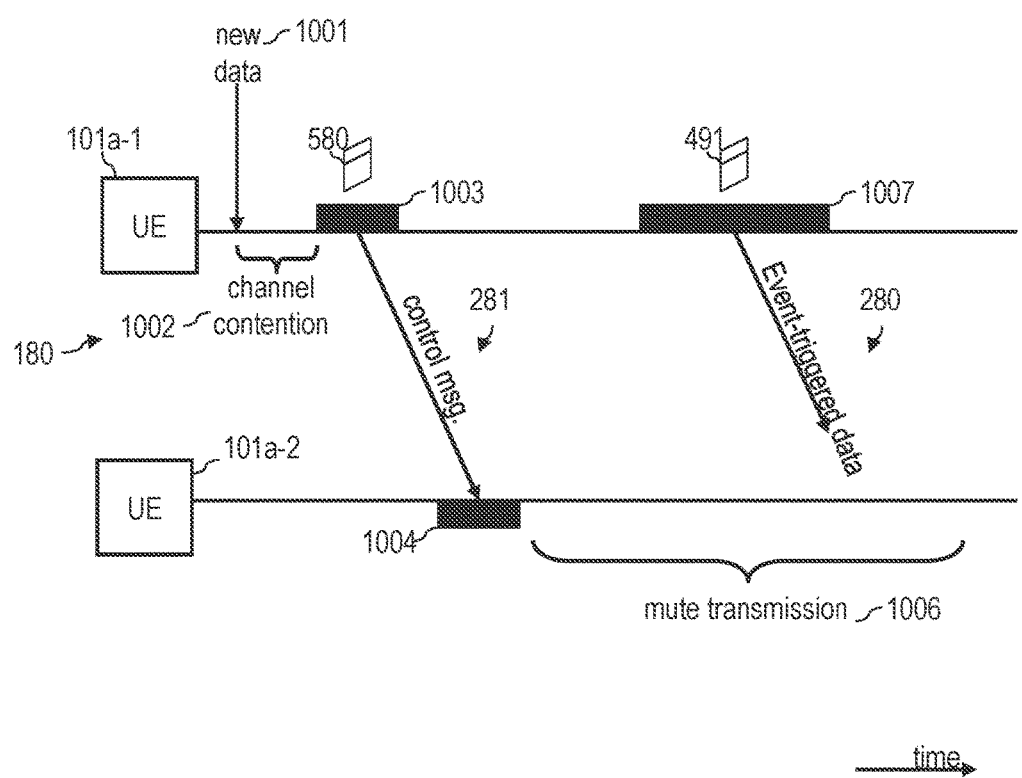
FIG. 10 is a signalling diagram of sending of a data packet of the event-triggered data via the broadcast transmission employing the first radio resources according to various embodiments.

FIG. 10 is a signalling diagram illustrating wireless transmission between the UE 101a-1 and the UE 101b-1. According to the techniques as described herein, new event-triggered data is available at a transmit buffer of the UE 101a-1 at 1001. At 1002, channel contention of a control channel 281 occurs: Because the UE 101a-1 has the corresponding data packet 491 of the event-triggered data scheduled for UL transmission, the UE 101*a*-1 senses the control channel 281, in particular those time-frequency resources 215 associated with the broadcast transmission 180. If the control channel 281 is idle, i.e., the remaining UEs 101*a*-2, 101*a*-3, 101*b*-1, 101*b*-2 are not transmitting, the UE 101*a*-1 broadcasts the control message 580 at 1003 via the broadcast transmission 180 on the control channel 281. The control message 580 is received by the remaining UEs 101*a*-2, 101*a*-3, 101*b*-1, 101*b*-2, i.e., in particular by UE 101*a*-2 at 1004. The UE 101*a*-2 decodes the control message 580. It thereby retrieves the indication of the time-frequency resource block 215 which the UE 101*a*-1 employs for sending the data packet 491 on the channel 280 at 1007. The UE 101*b*-1 mutes transmission in this time-frequency resource block 215 at 1006 in the respective radio resources 221, 222, 223 on the channel 280. In particular, if the UE 101*b*-1 is capable of sending best-effort data, it blocks the best-effort data at this time-frequency resource block 215 on the channel 280 to allow the transmission of the data packet 491 by the UE 101*a*-1.

A scenario may occur where the control channel 281 is sensed to be busy at 1002. A reason for this may be that at 1002 the UE 101*a*-2 sends a control message 580. If this happens, the UE 101*a*-1 goes to back-off mechanism. An exponential back-off mechanism may be employed corresponding to the CSMA/CD techniques.

Figure 11:
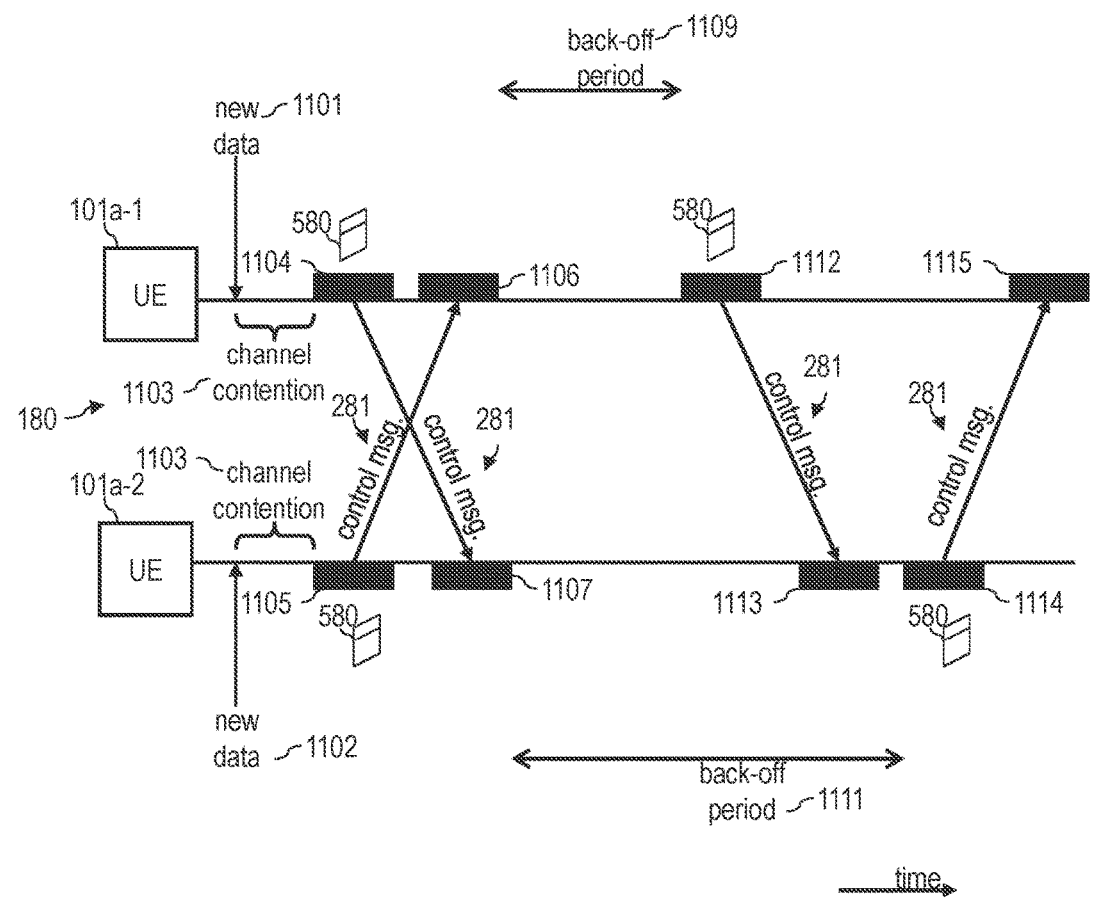
FIG. 11 is a signalling diagram of sending of a data packet of the event-triggered data via the broadcast transmission employing the first radio resources according to various embodiments.

A further scenario is shown in FIG. 11. Here, both the UE 101*a*-1 as well as the UE 101*a*-2 sense that the control channel 281 is idle at 1103. The control channel 281 comprises shared radio resources. Then, both the UE 101*a*-1 as well as the UE 101*a*-2 send—employing the same shared radio resources on the control channel 281—a respective control message 580 at 1104, 1105, respectively, the control messages 580 indicating the need of the UEs 101*a*-1, 101*a*-2 of sending a data packet 491 of the event-triggered data having arrived at the respective UL transmit buffer at 1101, 1102, respectively. The UE 101*a*-1 detects the collision, e.g., by measuring energy levels during 1106. The UE 101*a*-1 may block the broadcast transmission 180 and go to exponential back-off. The UE 101*a*-2 may act accordingly. Both UEs 101*a*-1, 101*a*-2 implement random back-off periods 1109, 1111 which avoids collision when re-sending the control messages 580 at 1112, 1113. Thus, the control messages 580 may be finally successfully received at 1113, 1115, respectively.

The detecting of the collision may involve sensing the signal level on the control channel 281 in response to sending the control message 580. A threshold comparison between the sensed signal level and a predefined signal threshold may be executed. Depending on the threshold comparison, the control message 580 may be selectively re-sent.

Figure 12:
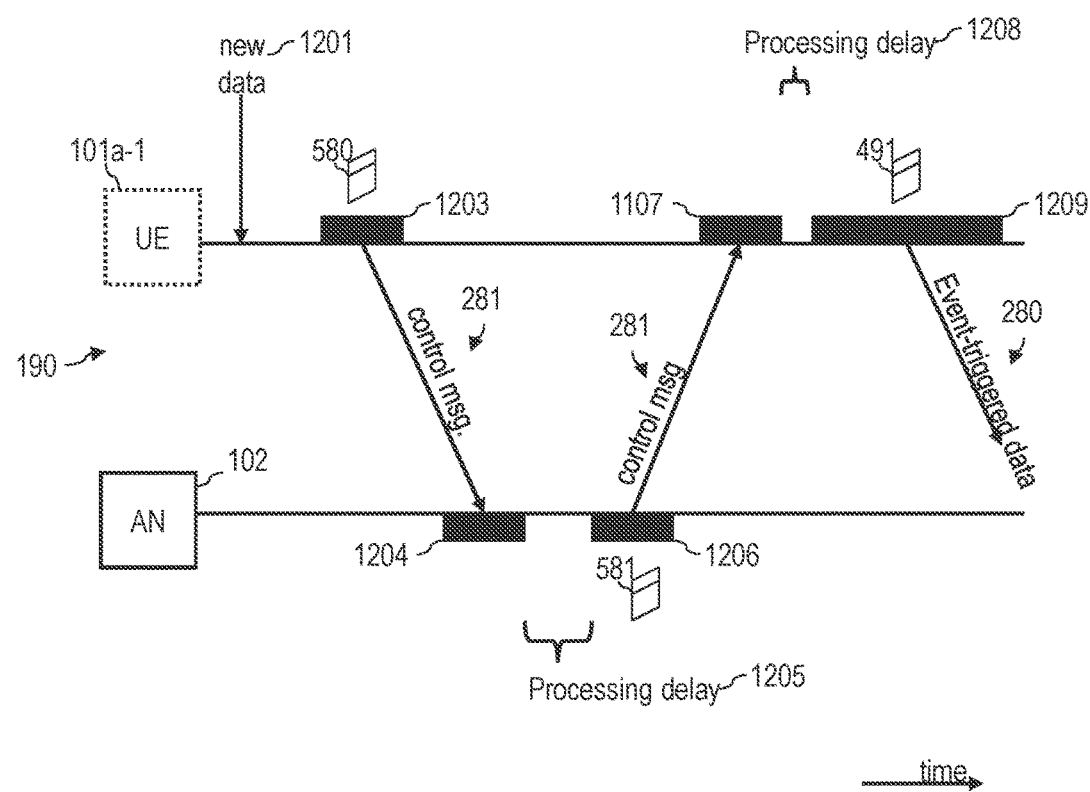
FIG. 12 is a signalling diagram of sending of a data packet of the event-triggered data via the broadcast transmission employing the first radio resources according to various embodiments.

In FIG. 12, a scenario is shown which does not rely on the D2D-assisted collision avoidance mechanism. Here, at 1201 event-triggered data arrives at a transmit buffer of the UE 101*a*-1. After optional channel contention (not shown in FIG. 12), the UE 101*a*-1 sends the control message 580 via the unicast transmission 190 to the access node 102 at 1203. The dedicated UL control channel 281 may be employed; e.g., the UL control channel 281 may not comprise shared radio resources rendering channel contention unnecessary. The access node 102 receives the control message 580 at 1204. After some processing delay 1205, the access node 102 sends the further control message 581 via the unicast transmission 190 to the UE 101*a*-1 at 1206. A dedicated DL control channel 281 may be employed; e.g., the DL control channel 281 may not comprise shared radio resources rendering channel contention unnecessary. The UE 101*a*-1 receives the further control message 581 at 1207. After some processing delay at 1208, the UE 101*a*-1 sends the data packet 491 at the time-frequency resource block(s) 215 indicated by the further control message 581.

In the scenario of FIG. 12, the latency may be assumed to correspond to three times the transmission time and two times the processing delay; this may amount to approximately three times a duration of a frame 211 plus additional time for data processing (processing delay). Here, the access node 102 sends the further control message 581 in the next available frame 211 after 1204 and the UE 101*a*-1 sends the data packet 491 in the next available frame 211 after 1107, i.e., the processing delay 1205, 1208 can be less than the duration of a frame 211. The transmission of the data packet 491 is scheduled in the third frame 211 after 1203. Where the duration of the frame 211 amounts to, e.g., 0.2 milliseconds, the total time between 1201 and 1209 (latency) amounts to approximately 0.6 milliseconds.

Figure 13:
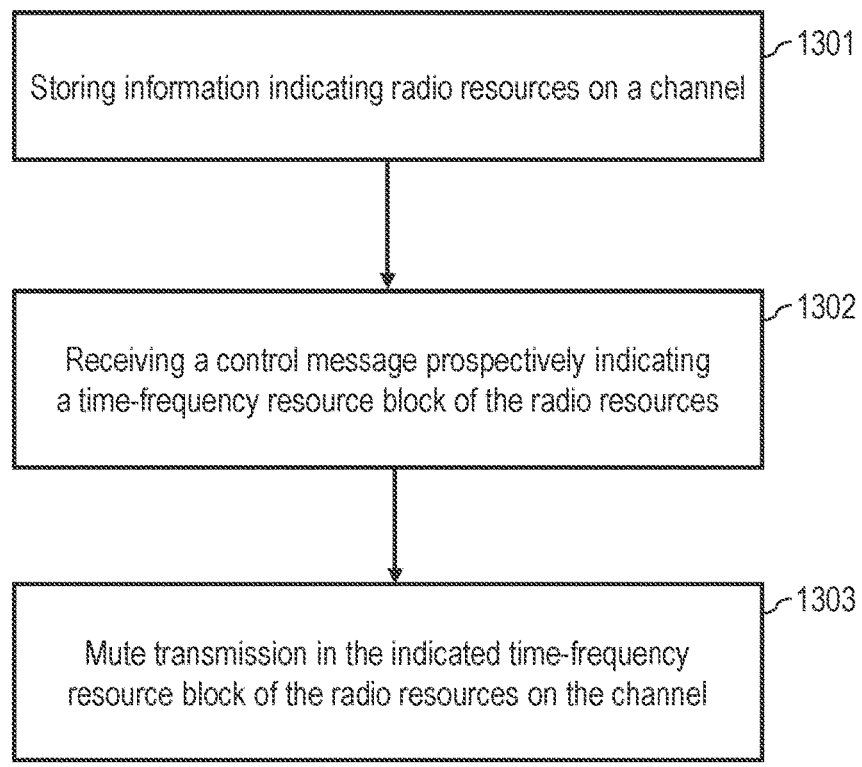
FIG. 13 is a flowchart of a method according to various embodiments.

FIG. 13 is a flowchart of a method according to various embodiments. At 1301, information indicating the radio resources 221, 222, 223 is stored. E.g., the information can indicate the first radio resources 221 and/or the second radio resources 222. The first radio resources 221 and/or the second radio resources 223 may be shared between the various UEs 101*a*-1, 101*a*-2, 101*a*-3, 101*b*-1, 101*b*-2. It is also possible that the radio resources 223 are not distinctly allocated to the event-triggered data and the best-effort data, but are reserved for, both, the event-triggered data and the best-effort data.

At 1302, the control message 580, 581 is received. The control message 580, 581 may be received via the control channel 281 and/or the channel 280 via at least one of the broadcast transmission 180 and the unicast transmission 190. The control message 580, 581 prospectively indicates the time-frequency resource block 215 of the radio resources 221, 222, 223.

The control message 580, 581 prompts the respective UE 101*a*-1, 101*a*-2, 101*a*-3, 101*b*-1, 101*b*-2 to mute transmission in the indicated time-frequency resource block 215 at 1303. Thus, the collision avoidance mechanism may be implemented. If the control message 580, 581 is received from a further UE 101*a*-1, 101*a*-2, 101*a*-3, 101*b*-1, 101*b*-2—e.g., via the broadcast transmission 180 on the control channel 281—, a D2D-assisted collision avoidance mechanism may be implemented. The control message 580, 581 may also be received from the access node 102.

Optionally, the respective UE 101*a*-1, 101*a*-2, 101*a*-3, 101*b*-1, 101*b*-2 may send a data packet 491, 492 of the event-triggered data and/or the best-effort data via the radio resources 221, 222, 223 at another time-frequency resource block 215 than the one indicated by the control message 580 (not shown in FIG. 13).

Figure 14:
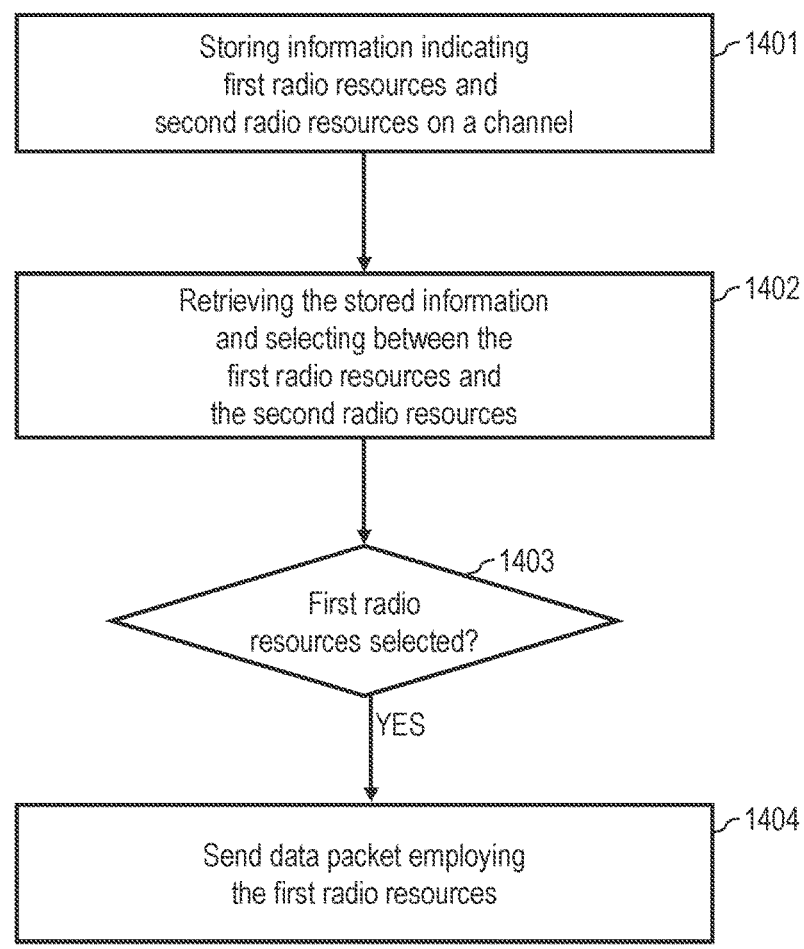
FIG. 14 is a flowchart of a method according to various embodiments.

FIG. 14 is a flowchart according to various embodiments. At 1401, information indicating the first radio resources 221 and the second radio resources 222 is stored at a memory.

The first radio resources 221 of the channel 280 are reserved for the event-triggered data; the second radio resources 222 of the channel 280 are reserved for the best-effort data. The first and second radio resources 221, 222 are shared radio resources. At 1402, the information is retrieved from the memory. Then, selecting between the first radio resources 221 and the second radio resources 222 occurs for sending of a data packet 492 of the best-effort data. 1402 may be in response to the data packet 492 becoming available in an UL transmit buffer.

At 1402, different decision criteria can be taken into account for said selecting between the first radio resources 221 and the second radio resources 222. E.g., it is possible that said selecting depends on a traffic load of the channel 280 in the second radio resources 222. Alternatively or additionally, said selecting may depend on whether a control message 580, 581 has been received, said control message 580, 581 prompting to mute transmission on the channel 280. Alternatively or additionally, said selecting may depend on the time-frequency resource block 215 which is indicated by said control message 580, 581 previously received.

E.g., the traffic load may be determined. Determining the traffic load in the second radio resource 222 may comprise executing a threshold comparison between the determined traffic load and a predefined traffic threshold. It is possible that the first radio resources 222 are selected at 1402 if said threshold comparison between the determined traffic load and a predefined traffic threshold yields that the traffic load falls below the predefined traffic threshold.

At 1403, it is checked whether the first radio resources have been selected at 1402. If this is the case, at 1404, the data packet 492 of the best-effort data is sent employing the first radio resources 221. Thus, it is possible to re-use the first radio resources 221—which had been originally reserved further event-triggered data—for said sending of the data packet 492 of the best-effort data.

If, at 1403 it is judged that the second radio resources 222 have been selected at 1402, the method may optionally include sending of the data packet 492 of the best-effort data employing the second radio resources 222 (not shown in FIG. 14).

Figure 15:
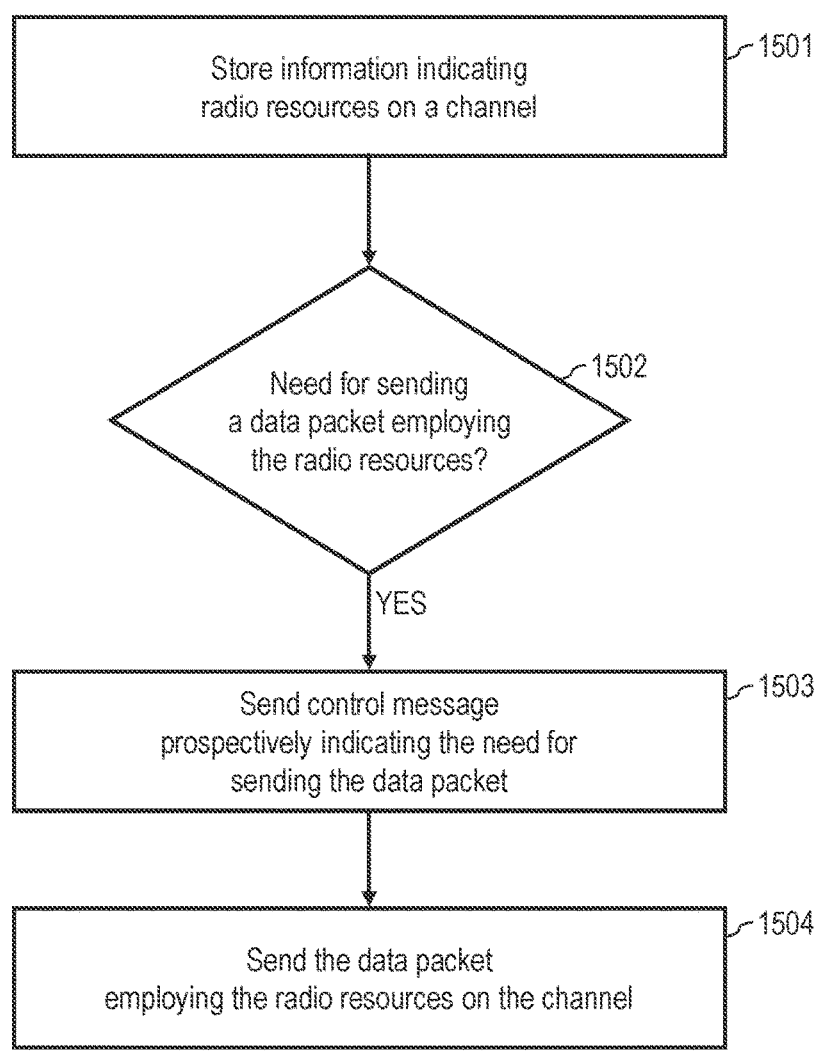
FIG. 15 is a flowchart of a method according to various embodiments.

FIG. 15 is a flowchart of a method according to various embodiments. At 1501, information indicating the radio resources 221, 222, 223 is stored in a memory. The radio resources 221, 222, 223 are reserved at least for the event-triggered data. Additionally, it is also possible that the radio resources 221, 222, 223 are reserved for the best-effort data. E.g., at 1501, it is possible to store information which indicates the first radio resources 221 being reserved for the event-triggered data and the second radio resources 222 being reserved for the best-effort data.

At 1502, it is checked whether a need for sending a data packet 491 of the event-triggered data and employing the radio resources 221, 222, 223 exists. E.g., at 1502, it is possible to check whether a data packet 491 of the event-triggered data is pending for transmission in an UL transmit buffer of the respective UE 101*a*-1, 101*a*-2, 101*a*-3, 101*b*-1, 101*b*-2.

If at 1502 it is judged that the need for sending the data packets 491 exists, the method commences with 1503. At 1503, the control message 580 is sent. The control message 580 prospectively indicates the need of sending the data packet 491.

Generally, it is possible to employ different techniques of sending the control messages 580 at 1503. E.g., it is possible that at 1503, the control message 580 is sent via the broadcast transmission 180 to any further UEs and/or to the access node 102. Alternatively or additionally at 1503, the control message 580 may be sent via the unicast transmission 190 to the access node 102. Generally, it is possible that the control message 580 is sent via the channel 280 on which the radio resources 221, 222, 223 reside; alternatively or additionally, the control message 580 may be sent on the control channel 281.

Further, the content of the control message 580 sent at 1503 may differ in various scenarios. In one scenario, the control message 1503 may implicitly or explicitly indicate the need for sending the data packet 491, e.g., without specifying a particular time-frequency resource block 215 which is envisioned for said sending of the control message 580. In other scenarios, it is possible that the control message 580 explicitly or implicitly indicates one or more particular time-frequency resource blocks 215 for which sending of the control message 580 is scheduled. E.g., it is possible that the control message 580 indicates a plurality of candidate time-frequency resource blocks 215.

Depending on a further control message 581 received after sending of the control message 580 and positively or negatively acknowledging the plurality of candidate time-frequency resource blocks 215, one or more of the candidate time slots may be specifically selected for said sending of the control message 580.

At 1504, the data packet 591 of the event-triggered data is sent employing the radio resources 221, 222, 223. In particular, in 1504 it is possible that the data packet 491 is sent in the particular time-frequency resource block 215 which has been indicated by the control message 580 sent at 1503. Alternatively or additionally, at 1504 the data packet 491 can be sent in the time-frequency resource block 250 which has been indicated by a further control message (not shown in FIG. 15) which has been received after said sending the control message 580 at 1503.

As can be seen from the above, it is possible that the decision logic for selecting the particular time-frequency resource block 215 which is used for said sending control message 580 fully or partly resides in the respective UE 101*a*-1, 101*a*-2, 101*a*-3, 101*b*-1, 101*b*-2 which sends the data packet 491 at 1504. Likewise, according to various scenarios it is possible that this decision logic of selecting the time-frequency resource block 215 used for said sending of the data packets 491 fully or partly resides within the access node 102 and/or one of the further UEs.

Figure 16:
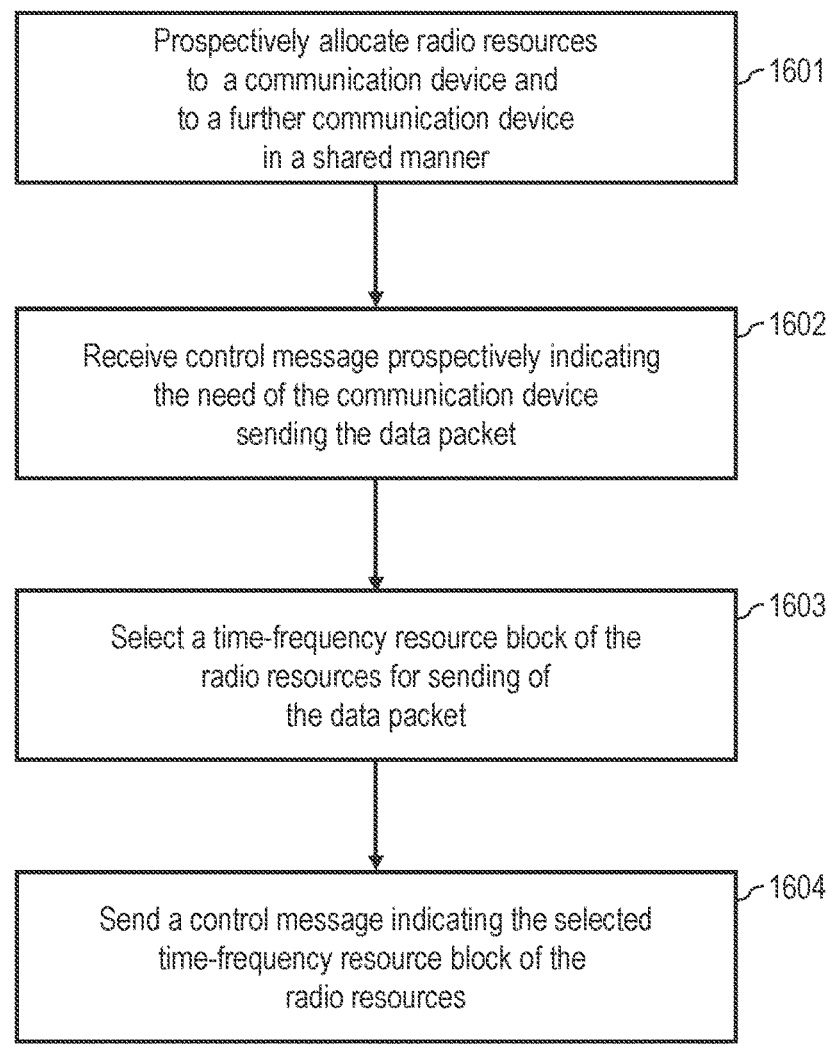
FIG. 16 is a flowchart of a method according to various embodiments.

In FIG. 16, the method according to various embodiments is illustrated in a flowchart. At 1601, the radio resources 221, 222, 223 are prospectively allocated to a UE 101*a*-1, 101*a*-2, 101*a*-3, 101*b*-1, 101*b*-2 and to a further UE 101*a*-1, 101*a*-2, 101*a*-3, 101*b*-1, 101*b*-2 in a shared manner. E.g., at 1601, it is possible to prospectively allocate first radio resources 221 reserved for the event-triggered data and/or prospectively allocate the second radio resources 222 reserved for the best-effort data. Generally, the radio resources 221, 222, 223 that are prospectively allocated at 1501 can be reoccurring radio resources.

At 1602, the control message 580 is received. The control message 580 prospectively indicates the need of a given UE 101*a*-1, 101*a*-2, 101*a*-3, 101*b*-1, 101*b*-2 sending the data packet 491 of the event-triggered data.

Then, at 1603, the time-frequency resource block 250 of the radio resources for sending of the data packets 491 is selected.

At 1604, the further control message 581 indicating the selected time-frequency resource block 215 of the radio resources 221, 222, 223 is sent. The further control message 581 may be sent on the control channel 281 and/or the channel 280 via at least one of the broadcast transmission 180 and/or the unicast transmission.

E.g., the method according to FIG. 16 can be executed by the access node 202. In such a scenario, it is possible that the decision logic for selecting the time-frequency resource block 215 at 1603 resides at least partly within the access node 102. E.g., it is possible that the control message 580 received at 1602 indicates a plurality of candidate time-frequency resource blocks 215. Then, at 1503, a particular time-frequency resource block 215 may be selected from the plurality of candidate time-frequency resource blocks 215 indicated by the control message 580. It is possible that the further control message 581 positively and/or negatively indicates at least some of the candidate time-frequency resource blocks 215 indicated by the control message 580.

Figure 17:
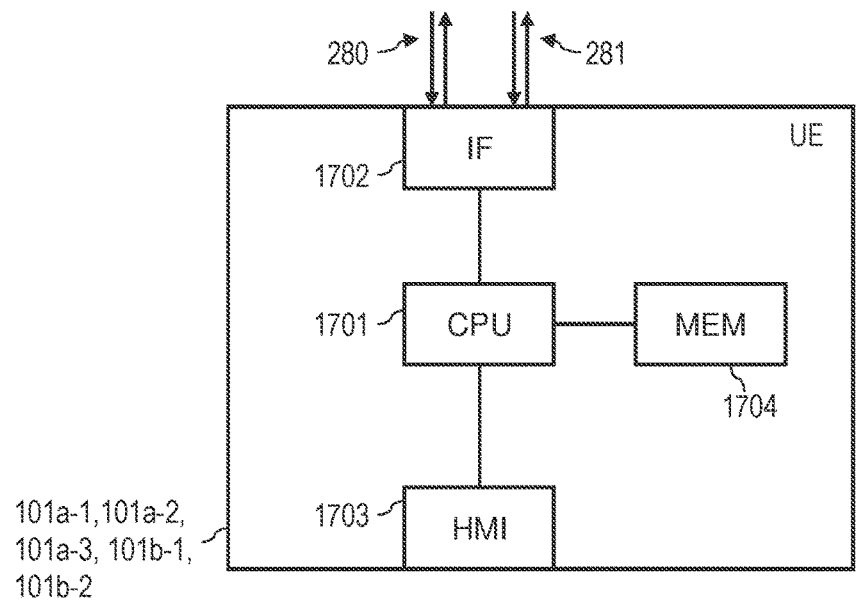
FIG. 17 schematically illustrates the communication device according to various embodiments.

FIG. 17 schematically illustrates the UEs 101a-1, 101a-2, 101a-3, 101b-1, 101b-2. The UEs 101a-1, 101a-2, 101a-3, 101b-1, 101b-2 comprise a processor 1701. The processor 1701 may be a multi-core processor; alternatively or additionally, distributed computing may be relied upon. The UEs 101a-1, 101a-2, 101a-3, 101b-1, 101b-2 further comprise a wireless interface 1702. The wireless interface 1702 may also be referred to as a radio interface. The wireless interface 1702 is configured to wirelessly transceive data on the channel 280 and the control channel 281 of the MTC network 100. Generally, the UL control channel 281 may correspond to the PUCCH in case of the 3GPP LTE radio access technology. Likewise, the DL control channel 281 may generally correspond to the PDCCH in case of the 3GPP LTE radio access technology. Hence, the wireless interface 1702 may support, both, UL and DL transmission. The UEs 101a-1, 101a-2, 101a-3, 101b-1, 101b-2 further comprise a human-machine interface (HMI) 1703. E.g., the HMI 1703 may comprise one or more of the following: a keyboard, a touch-sensitive display, a display, a button, a loudspeaker, a speech recognition system, etc. The UEs 101a-1, 101a-2, 101a-3, 101b-1, 101b-2 further comprise a memory 1704, e.g., a non-volatile memory. The memory 1704 stores control instructions which, when executed by the processor 1701, cause the respective UE 101a-1, 101a-2, 101a-3, 101b-1, 101b-2 to perform techniques according to FIGS. 13-15. The memory 1704 may further store information regarding the radio resources 221, 222, 223. This is possible because the radio resources 221, 222, 223 are reserved.

Figure 18:
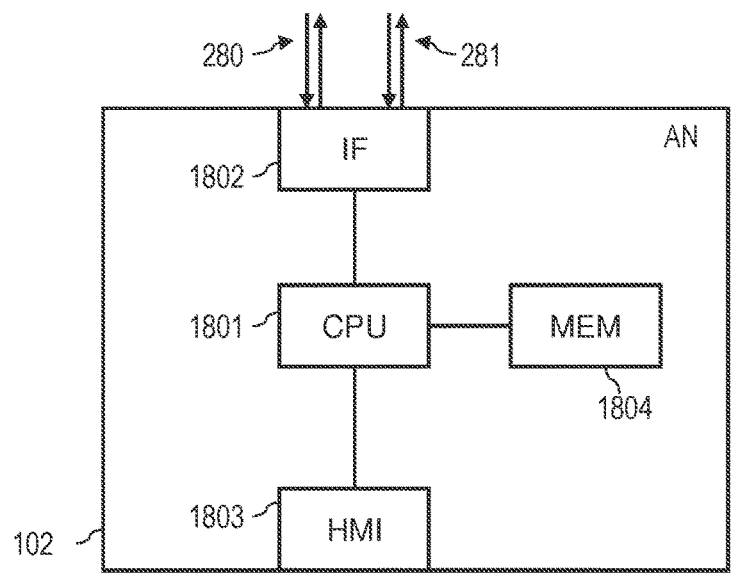
FIG. 18 schematically illustrates the access node according to various embodiments.

FIG. 18 schematically illustrates the access node 102. The access node 102 comprises a processor 1801. The processor 1801 may be a multi-core processor. Alternatively or additionally, distributed computing may be relied upon. The access node 102 further comprises a wireless interface 1802. The wireless interface 1802 may also be referred to as a radio interface. The wireless interface 1802 is configured to wirelessly transceive data on the channel 280 of the MTC network 100 and the control channel 281 of the MTC network 100. Generally, the UL control channel 281 may correspond to the PUCCH in case of the 3GPP LTE radio access technology. Likewise, the DL control channel 281 may generally correspond to the PDCCH in case of the 3GPP LTE radio access technology. Hence, the wireless interface 1802 may support both UL and DL transmission. The access node 102 further comprises a HMI 1803. E.g., the HMI 1803 may comprise one or more of the following: a keyboard, a touch-sensitive display, a display, a button, a loudspeaker, a speech recognition system, etc. The access node 102 further comprises a memory 1804, e.g., a non-volatile memory. The memory 1804 stores control instructions, which, when executed by the processor 1801 causes the access node 102 to perform techniques according to FIG. 16. The memory 1804 may further store information regarding the radio resources 221, 222, 223. This is possible because the radio resources 221, 222, 223 are reserved, respectively prospectively allocated by the access node 102.

Figure 19:
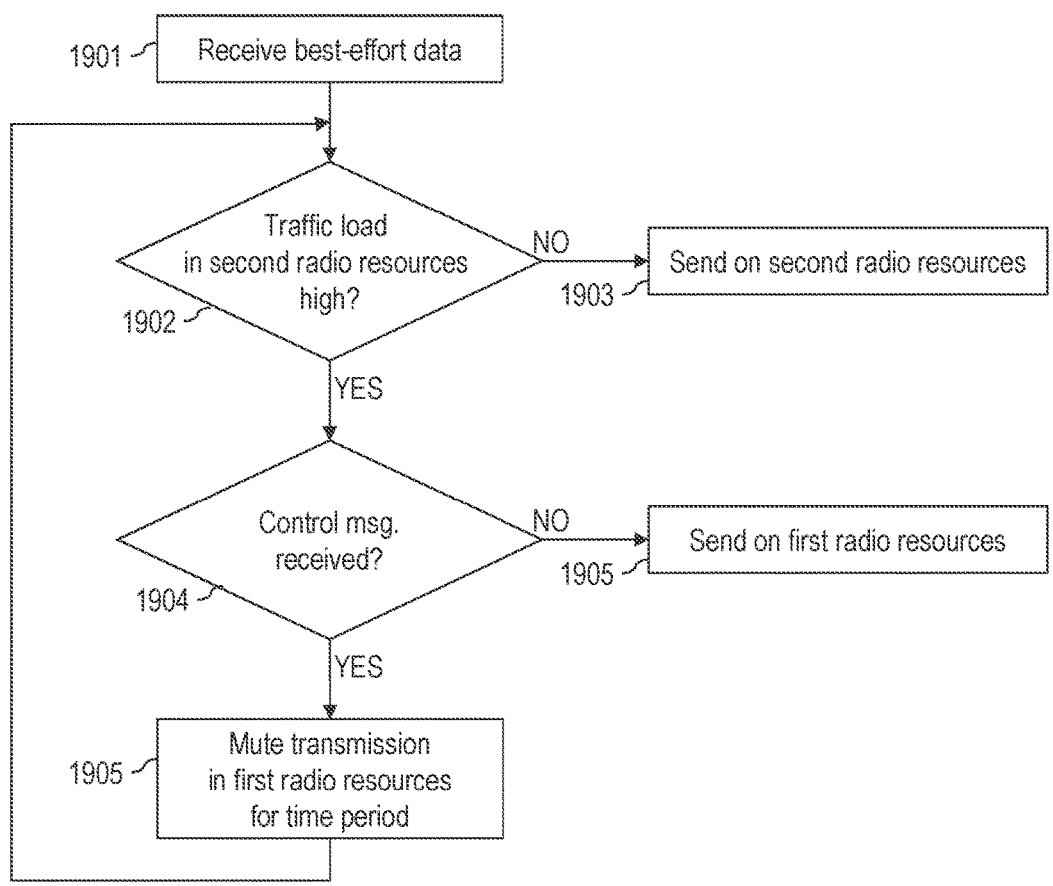
FIG. 19 is a flowchart of a method according to various embodiments.

FIG. 19 is a flowchart of a method according to various embodiments. At 1901, a data packet 492 of the best-effort data is received at a transmit buffer of a given UE 101a-1, 101a-2, 101a-3, 101b-1, 101b-2. At 1902, it is checked whether the traffic load in the second radio resources 222 is high. E.g., as part of 1902, it is possible to determine the traffic load in the second radio resources and compare the determined traffic load with a predefined traffic threshold.

If at 1902 it is determined that the traffic load in the second radio resources 222 is not high, the data packet 492 of the best-effort data received at 1901 is sent employing the second resources 222 in 1903.

If, however, at 1902 it is judged that the traffic load of the second radio resources is comparably high, it is checked at 1904 whether a control message 580, 581 has been previously received. If the control message 580, 581 has not been received, the data packet 492 of the best-effort data is sent employing the first radio resources 221 at 1905. If, however, at 1904 it is judged that the control message 580, 581 has been previously received, the transmission in first radio resources 221 is muted for a predefined time period at 1905 and/or in the indicated time-frequency resource block(s) 215.

Figure 20:
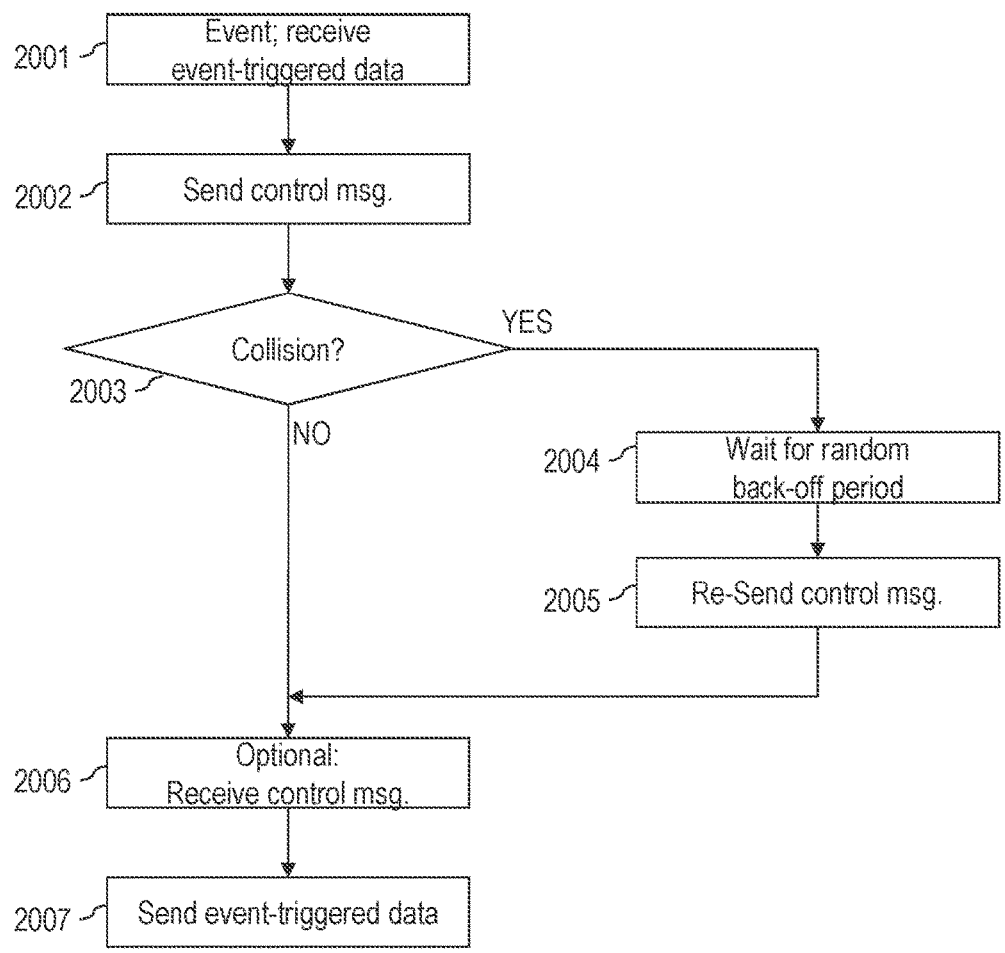
FIG. 20 is a flowchart of a method according to various embodiments.

In FIG. 20, a flowchart of a method according to various embodiments is illustrated. At 2001, an event occurs. Because of this, a data packet 491 of the event-triggered data is received in a transmit buffer of the respective UE 101a-1, 101a-2, 101a-3, 101b-1, 101b-2.

Receiving the data packet 491 triggers sending of the control message 580 at 2002. The control message 580 may optionally indicate a specific time-frequency resource block 250 or a plurality of candidate time-frequency resource blocks intended for sending of the data packet 491.

At 2003, it is checked whether while sending the control message 580 at 2002, a collision with a further device transmitting on the channel 280 has occurred. If at 2003 a collision is detected, the method commences at 2004. At 2004, the UE goes to back-off. I.e., the UE waits for a random back-off period according to a CSMA/CD technique. Then, at 2005, the control message 480 is re-sent and the method commences at 2006.

If, however, at 2003 no collision is detected, the method commences directly at 2006. At 2006, optionally, the further control message 581 is received. E.g., if the control message 580 includes a plurality of candidate time-frequency resource blocks, the further control message 581 may positively or negatively acknowledge the plurality of candidate time-frequency resource blocks 215. It is also possible that the further control message 581 indicates a single time-frequency resource block 215, e.g., if the control message 580 does not indicate any time-frequency resource block 215.

AT 2007, the data packet 491 of the event-triggered data is sent employing the time-frequency resource block 215.

Figure 21:
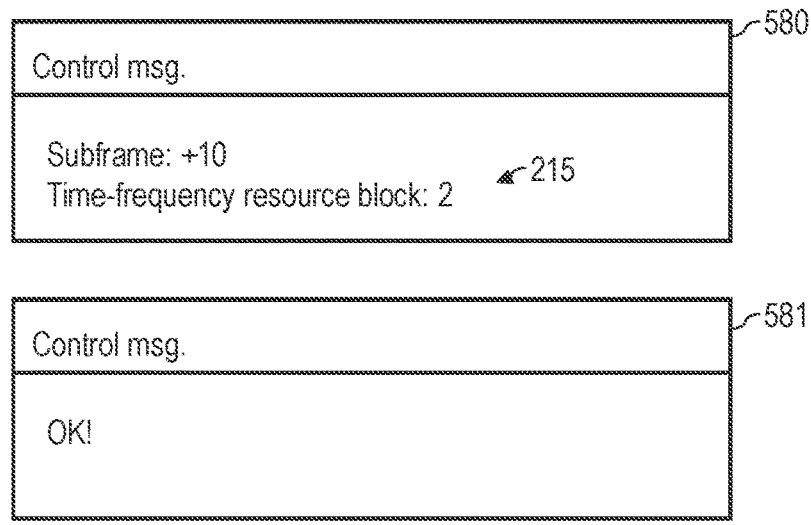
FIG. 21 schematically illustrates control messages according to various embodiments.

In FIG. 21, the control message 580 and the further control message 581 are illustrated. The control message 580 includes an indication of the particular time-frequency resource block 215 which is intended for sending of the data packet 491 of the event-triggered data. In the scenario of FIG. 21, the particular time-frequency resource block 215 is relatively defined with respect to a reference subframe 211.

In the scenario of FIG. 21, the further control message 580 positively acknowledges that the time-frequency resource block 215 is indicated by the control message 580.

Likewise, it would be possible that the further control message 581 negatively acknowledges that the time-frequency resource block 215 is indicated by the control message 580. Then it might be possible to propose a different time-frequency resource block for said sending of the data packet 491 of the event-triggered data.

Figure 22:
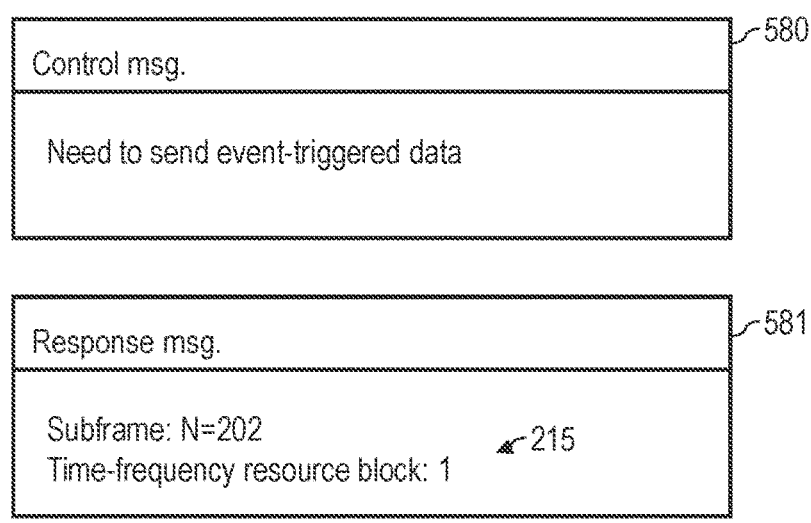
FIG. 22 schematically illustrates control messages according to various embodiments.

In FIG. 22, the control message 580 and the further control message 581 are illustrated according to various embodiments. In the scenario of FIG. 2, the control message 580 does not include an indication of the time-frequency resource block 215; rather, the control message 580 explicitly indicates the need to send the data packet 491 of the event-triggered data. It would be possible that the need of sending the data packets 491 of the event-triggered data is implicitly indicated by the control message 580.

The further control message 581 in the scenario of FIG. 22 includes the indication of the time-frequency resource block 215.

Generally, it may be possible that the control message 580 and/or the further control message 581 indicate a plurality of time-frequency resource blocks 215.

Summarizing, above techniques have been shown which enable to re-use resources reserved at least for a first class of data for the transmission of a second class of data. A D2D-assisted collision avoidance mechanism is possible where the various UE pre-emptively broadcast a need for sending a data packet of the first class of data. Other scenarios do not rely on the D2D-assisted collision avoidance mechanism: E.g., when an access node of a wireless network gets an indication of one of a given UE that it needs to send a data packet of the first class of data, the access node can send a control message to the remaining UEs to free-up radio resources for sending of that data packet. Along with this, the access node may indicate which part or time-frequency resource block of the radio resources should be used by the requesting UE; it is also possible that the requesting UE autonomously picks one or few time-frequency resource blocks to transmit the data packet of the first class of data. Said picking may be based on reliability requirements, QoS requirements, and/or channel conditions.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

E.g., above reference has been primarily made to two specific classes of data, i.e., the event-triggered data and the best-effort data. Yet, in general it is possible that different types of data are subject to techniques as illustrated above. Techniques as illustrated above can be readily applied to any two classes of data, i.e., a first class of data and a second class of data. E.g., the first class of data and the second class of data may be characterized in terms of different transmission priority or the like.

It may also be possible that the control message includes an indication of the priority of the data packet of the event-triggered data to be transmitted. Then, if further UEs have lower priority event-triggered data to be transmitted, the further UEs may postpone the transmission, i.e., execute backoff.

While above various embodiments have been discussed in view of sending of data packets via the broadcast transmission or the unicast transmission, it is generally possible to send the data packets via any of the broadcast and unicast transmission. Likewise, sending of control messages may occur via unicast transmission or broadcast transmission; and optionally employ a dedicated control channel. It is not necessary that the control channel comprises shared radio resources.

While above various embodiments have been discussed primarily with respect to the MTC network, generally such techniques may be readily applied to other kinds of networks. In particular, such techniques may be applied to a cellular network.

The invention claimed is:
1. A communication device, comprising:
a wireless interface configured to transceive data on a channel of a wireless network,
a memory configured to store information indicating first radio resources on the channel reserved for a first class of data and second radio resources on the channel reserved for a second class of data, the first radio resources and the second radio resources being shared between the communication device and a further communication device, and
at least one processor configured to:
transmit, via the wireless interface, the second class of data employing the first radio resources reserved for the first class of data while traffic load of the channel for the second radio resources is above a threshold, the first class of data having priority over the second class of data;
responsive to receiving a first control message transmitted from the further communication device, the first control message prospectively indicating a need of sending a data packet of the first class of data employing the first radio resources, mute transmission of the sending of the second class of data employing the first radio resources while the data packet of the first class of data is being transmitted by the further communication device;
responsive to the data packet of the first class being transmitted, resume transmitting the second class of data employing the first radio resources reserved for the first class of data while the traffic load of the channel for the second radio resources is above the threshold;
transmit, via the wireless interface, a second control message, said second control message prospectively indicating a need of sending a data packet of the first class of data employing the first radio resources, wherein the second control message prompts the further communication device to mute transmission to prevent the second class of data to be sent on the channel reserved for the first class of data while the data packet of the first class of data is being sent;
stop transmitting the second class of data employing the first radio resources to transmit the data packet of the first class of data;
transmit, via the wireless interface on the channel, the data packet of the first class of data employing the first radio resources;
resume transmitting the second class of data employing the first radio resources reserved for the first class of data while the traffic load of the channel for the second radio resources is above the threshold; and
repeat the steps to mute transmission and resume transmission responsive to receiving a further first control message.
2. The communication device of claim 1, wherein the at least one processor is configured to send the second control message via the wireless interface in a broadcast transmission to the further communication device and optionally to an access node of the wireless network.

3. The communication device of claim 1,
wherein the at least one processor is configured to send the second control message via the wireless interface to an access node of the wireless network in a unicast transmission.

4. The communication device of claim 1,
wherein the at least one processor is configured to select a time-frequency resource block of the first radio resources for sending of the data packet of the first class of data,
wherein the second control message prospectively indicates the time-frequency resource block and prompts the further communication device to mute transmission on the channel in the time-frequency resource block, and
wherein the at least one processor is configured to send, via the wireless interface on the channel, the data packet of the first class of data employing the selected time-frequency resource block of the radio resources.

5. The communication device of claim 1,
wherein the at least one processor is configured to receive, via the wireless interface from an access node of the wireless network in a unicast transmission or in a broadcast transmission, a further control message after said sending of the second control message, said further control message indicating a time-frequency resource block of the first radio resources for sending of the data packet of the first class of data,
wherein the further control message prompts the communication device to send the data packet of the first class of data employing the indicated time-frequency resource block, and
wherein the at least one processor is configured to send, via the wireless interface on the channel, the data packet of the first class of data employing the indicated time-frequency resource block of the radio resources.

6. The communication device of claim 1,
wherein the first class of data corresponds to event-triggered data, and
wherein the second class of data corresponds to best-effort data.

7. The communication device of claim 1,
wherein the first class of data has a higher transmission priority than the second class of data.

8. The communication device of claim 1,
wherein the at least one processor is configured to receive the first control message from the further communication device via the wireless interface in a unicast transmission.

9. A communication device, comprising:
a wireless interface configured to transceive data on a channel of a wireless network,
a memory configured to store information indicating first radio resources on the channel reserved for a first class of data and second radio resources on the channel reserved for a second class of data, the first radio resources and the second radio resources being shared between the communication device and a further communication device, and
at least one processor configured to:
    transmit, via the wireless interface, the second class of data employing the first radio resources reserved for the first class of data while traffic load of the channel for the second radio resources is above a threshold, the first class of data having priority over the second class of data;
    responsive to receiving a first control message transmitted from the further communication device, the first control message prospectively indicating a need of sending a data packet of the first class of data employing the first radio resources, mute transmission of the sending of the second class of data employing the first radio resources while the data packet of the first class of data is being transmitted by the further communication device;
    responsive to the data packet of the first class being transmitted, resume transmitting the second class of data employing the first radio resources reserved for the first class of data while the traffic load of the channel for the second radio resources is above the threshold; and
    transmit, via the wireless interface, a second control message, said second control message prospectively indicating a need of sending a data packet of the first class of data employing the first radio resources, wherein the second control message prompts the further communication device to mute transmission to prevent the second class of data to be sent on the channel reserved for the first class of data while the data packet of the first class of data is being sent.

10. The communication device of claim 9,
wherein the at least one processor is configured to send the second control message via the wireless interface in a broadcast transmission to the further communication device and optionally to an access node of the wireless network.

11. The communication device of claim 9,
wherein the at least one processor is configured to send the second control message via the wireless interface to an access node of the wireless network in a unicast transmission.

12. The communication device of claim 9,
wherein the at least one processor is configured to select a time-frequency resource block of the first radio resources for sending of the data packet of the first class of data,
wherein the second control message prospectively indicates the time-frequency resource block and prompts the further communication device to mute transmission on the channel in the time-frequency resource block, and
wherein the at least one processor is configured to send, via the wireless interface on the channel, the data packet of the first class of data employing the selected time-frequency resource block of the radio resources.

13. The communication device of claim 9,
wherein the at least one processor is configured to receive, via the wireless interface from an access node of the wireless network in a unicast transmission or in a broadcast transmission, a further control message after said sending of the second control message, said further control message indicating a time-frequency resource block of the first radio resources for sending of the data packet of the first class of data,
wherein the further control message prompts the communication device to send the data packet of the first class of data employing the indicated time-frequency resource block, and
wherein the at least one processor is configured to send, via the wireless interface on the channel, the data packet of the first class of data employing the indicated time-frequency resource block of the radio resources.

14. The communication device of claim 9,
wherein the first class of data corresponds to event-triggered data, and
wherein the second class of data corresponds to best-effort data.

15. The communication device of claim 9,
wherein the first class of data has a higher transmission priority than the second class of data.

16. The communication device of claim 9,
wherein the at least one processor is configured to receive the first control message from the further communication device via the wireless interface in a broadcast transmission.

17. A method of operating a communication device, comprising:
storing, in a memory of the communication device, information indicating first radio resources on the channel reserved for a first class of data and second radio resources on the channel reserved for a second class of data, the first radio resources and the second radio resources being shared between the communication device and a further communication device, and
transmitting, via a wireless interface of the communication device configured to transceive data on a channel of a wireless network, the second class of data employing the first radio resources reserved for the first class of data while traffic load of the channel for the second radio resources is above a threshold, the first class of data having priority over the second class of data;
muting transmission of the sending of the second class of data employing the first radio resources while the data packet of the first class of data is being transmitted by the further communication device responsive to receiving a first control message transmitted from the further communication device, the first control message prospectively indicating a need of sending a data packet of the first class of data employing the first radio resources;
resuming transmitting the second class of data employing the first radio resources reserved for the first class of data while the traffic load of the channel for the second radio resources is above the threshold responsive to the data packet of the first class being transmitted;
transmitting, via the wireless interface, a second control message, said second control message prospectively indicating a need of sending a data packet of the first class of data employing the first radio resources, wherein the second control message prompts the further communication device to mute transmission to prevent the second class of data to be sent on the channel reserved for the first class of data while the data packet of the first class of data is being sent;
stopping the transmitting of the second class of data employing the first radio resources to transmit the data packet of the first class of data;
transmitting, via the wireless interface on the channel, the data packet of the first class of data employing the first radio resources;
resuming the transmitting of the second class of data employing the first radio resources reserved for the first class of data while the traffic load of the channel for the second radio resources is above the threshold; and
repeating the steps to mute transmission and resume transmission responsive to receiving a further first control message.

18. The method of claim 17, further comprising:
selecting a time-frequency resource block of the first radio resources for sending of the data packet of the first class of data,
wherein the second control message prospectively indicates the time-frequency resource block and prompts the further communication device to mute transmission on the channel in the time-frequency resource block, and
sending, via the wireless interface on the channel, the data packet of the first class of data employing the selected time-frequency resource block of the radio resources.

19. A method of operating a communication device, comprising:
storing, in a memory of the communication device, information indicating first radio resources on the channel reserved for a first class of data and second radio resources on the channel reserved for a second class of data, the first radio resources and the second radio resources being shared between the communication device and a further communication device;
transmitting, via a wireless interface of the communication device configured to transceive data on a channel of a wireless network, the second class of data employing the first radio resources reserved for the first class of data while traffic load of the channel for the second radio resources is above a threshold, the first class of data having priority over the second class of data;
muting transmission of the sending of the second class of data employing the first radio resources while the data packet of the first class of data is being transmitted by the further communication device responsive to receiving a first control message transmitted from the further communication device, the first control message prospectively indicating a need of sending a data packet of the first class of data employing the first radio resources;
resuming the transmitting of the second class of data employing the first radio resources reserved for the first class of data while the traffic load of the channel for the second radio resources is above the threshold responsive to the data packet of the first class being transmitted; and
transmitting, via the wireless interface, a second control message, said second control message prospectively indicating a need of sending a data packet of the first class of data employing the first radio resources, wherein the second control message prompts the further communication device to mute transmission to prevent the second class of data to be sent on the channel reserved for the first class of data while the data packet of the first class of data is being sent.

20. The method of claim 19, further comprising:
selecting a time-frequency resource block of the first radio resources for sending of the data packet of the first class of data,
wherein the second control message prospectively indicates the time-frequency resource block and prompts the further communication device to mute transmission on the channel in the time-frequency resource block, and
sending, via the wireless interface on the channel, the data packet of the first class of data employing the selected time-frequency resource bloc.

* * * * *